INVENTOR:
JOE R. WHITEHURST
BY
Eaton, Bell, Hunt & Seltzer
ATTORNEYS

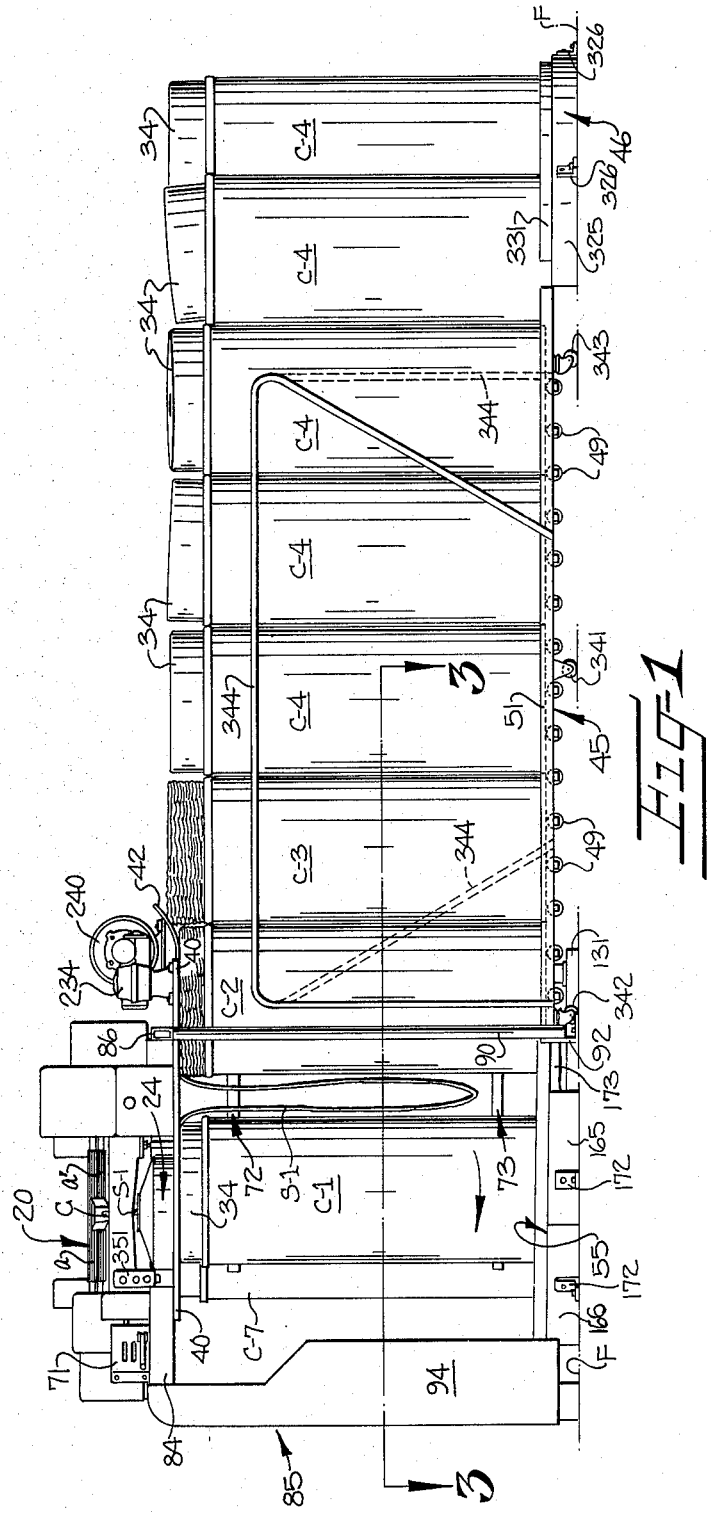

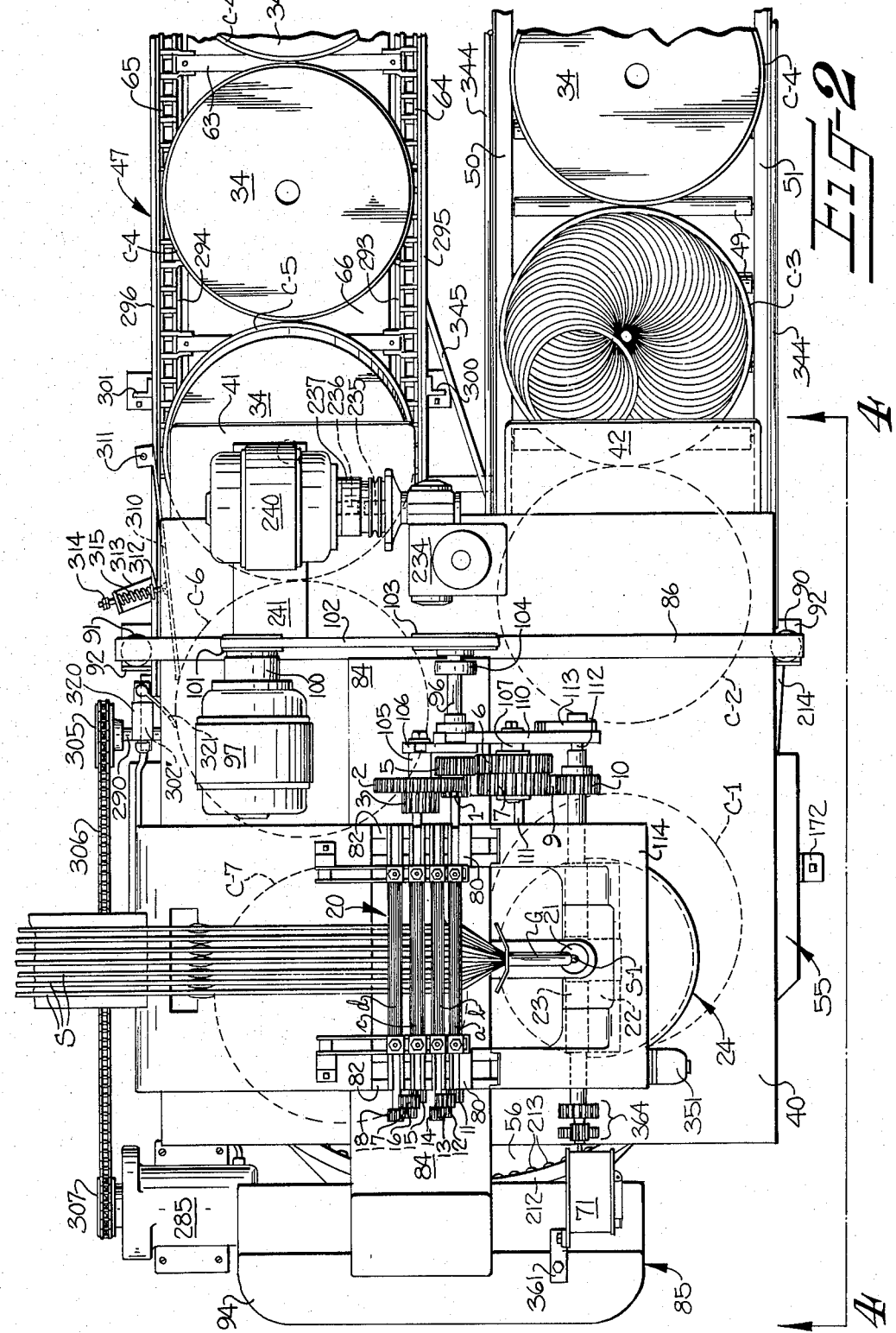

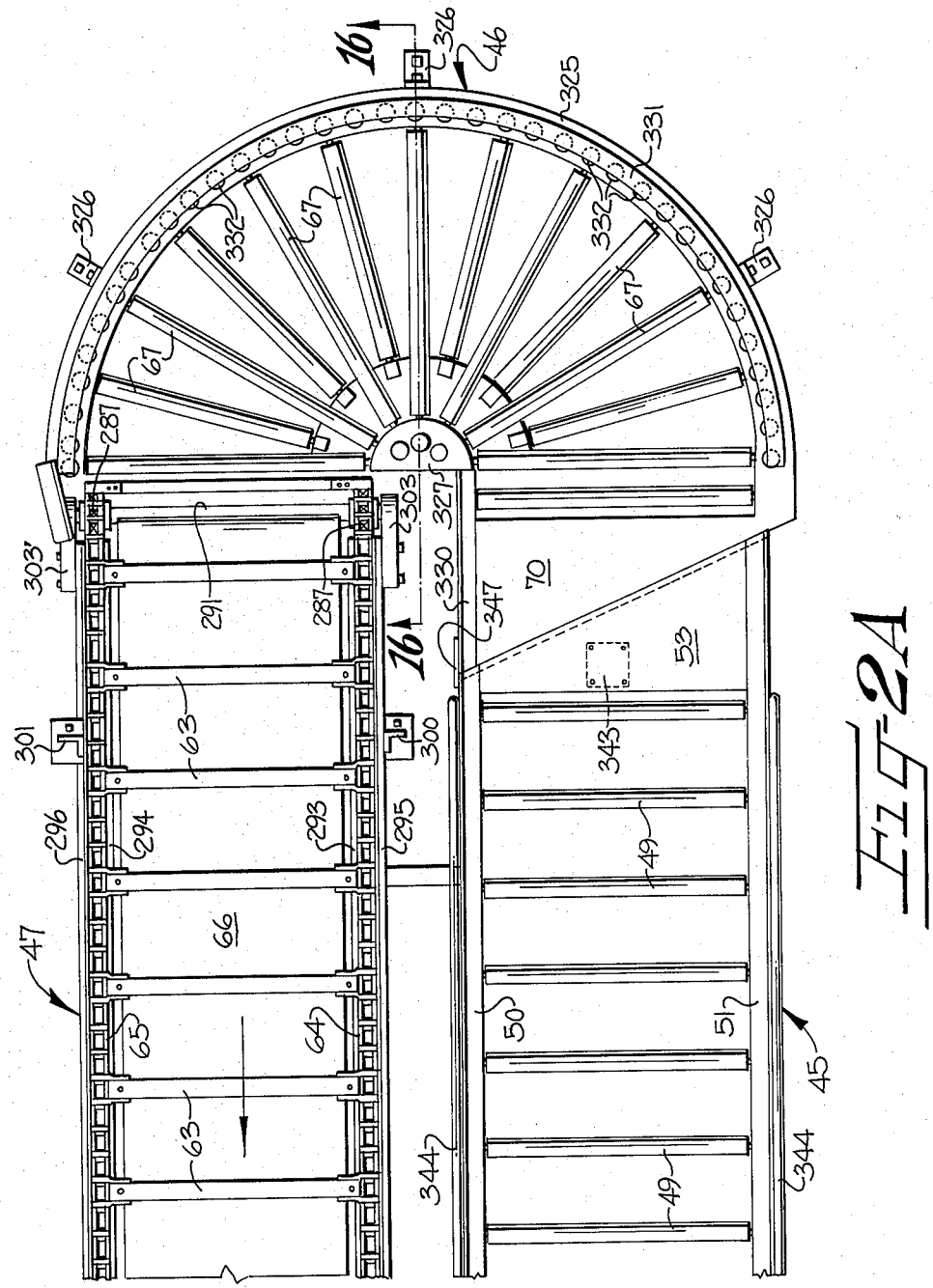

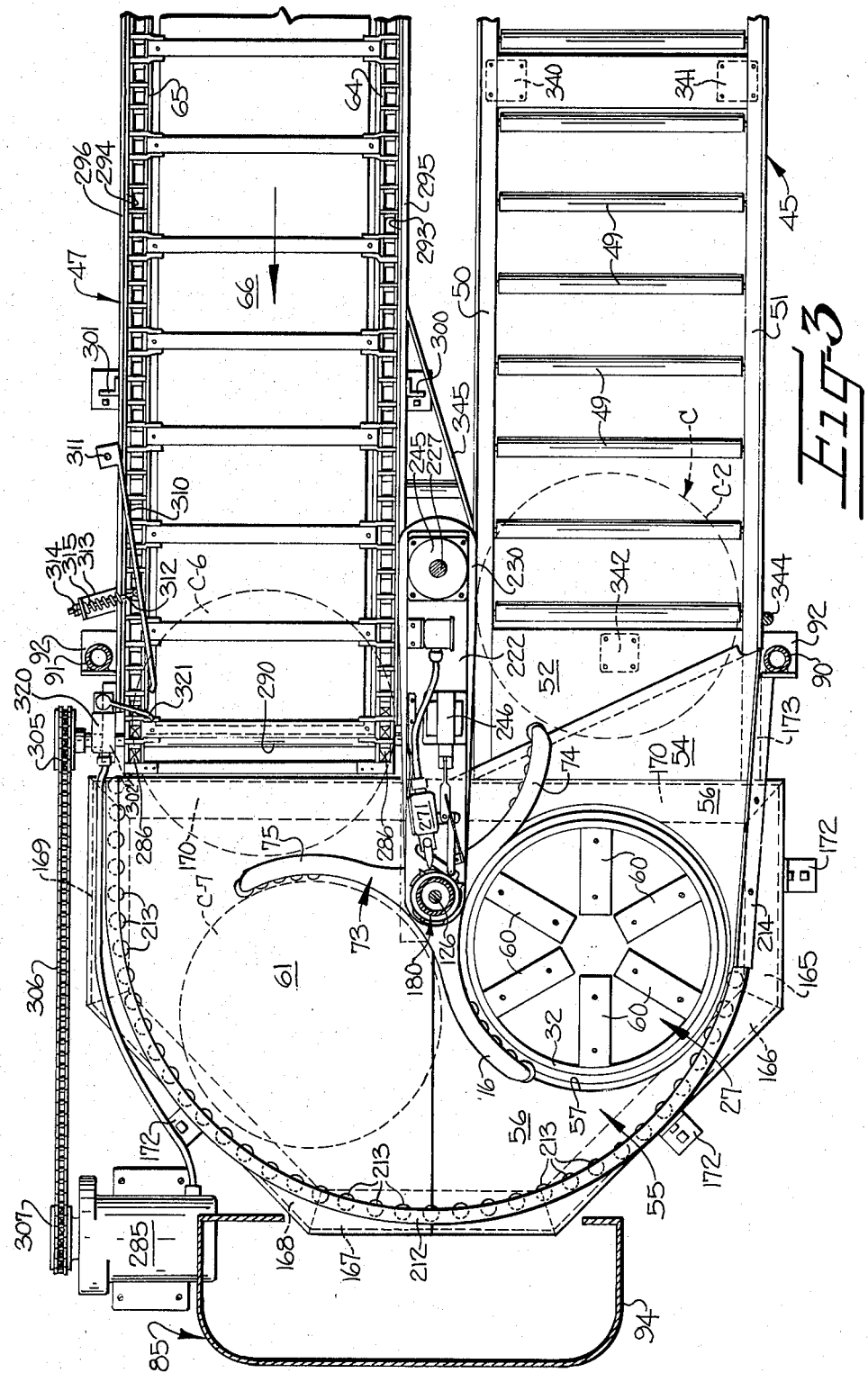

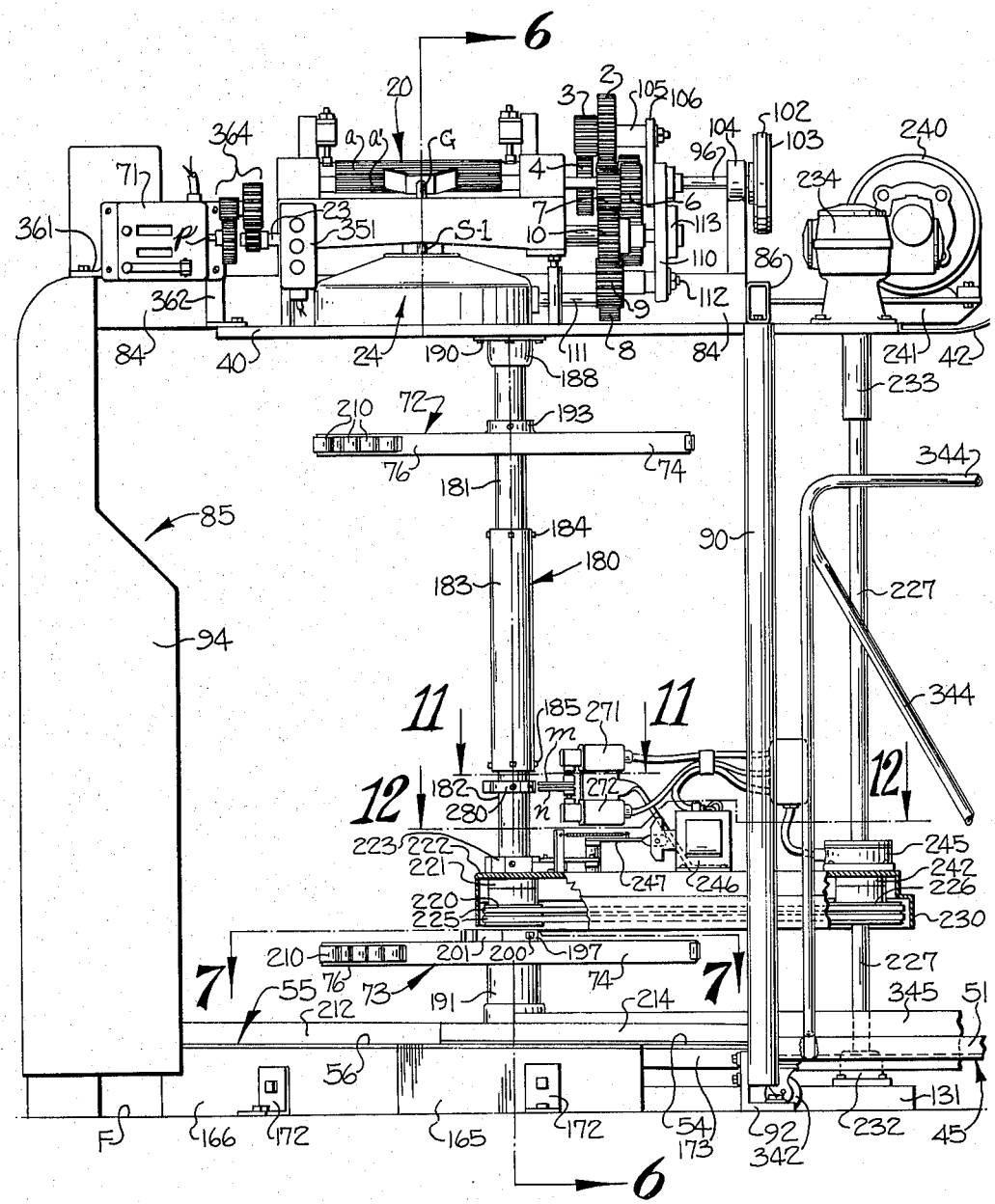

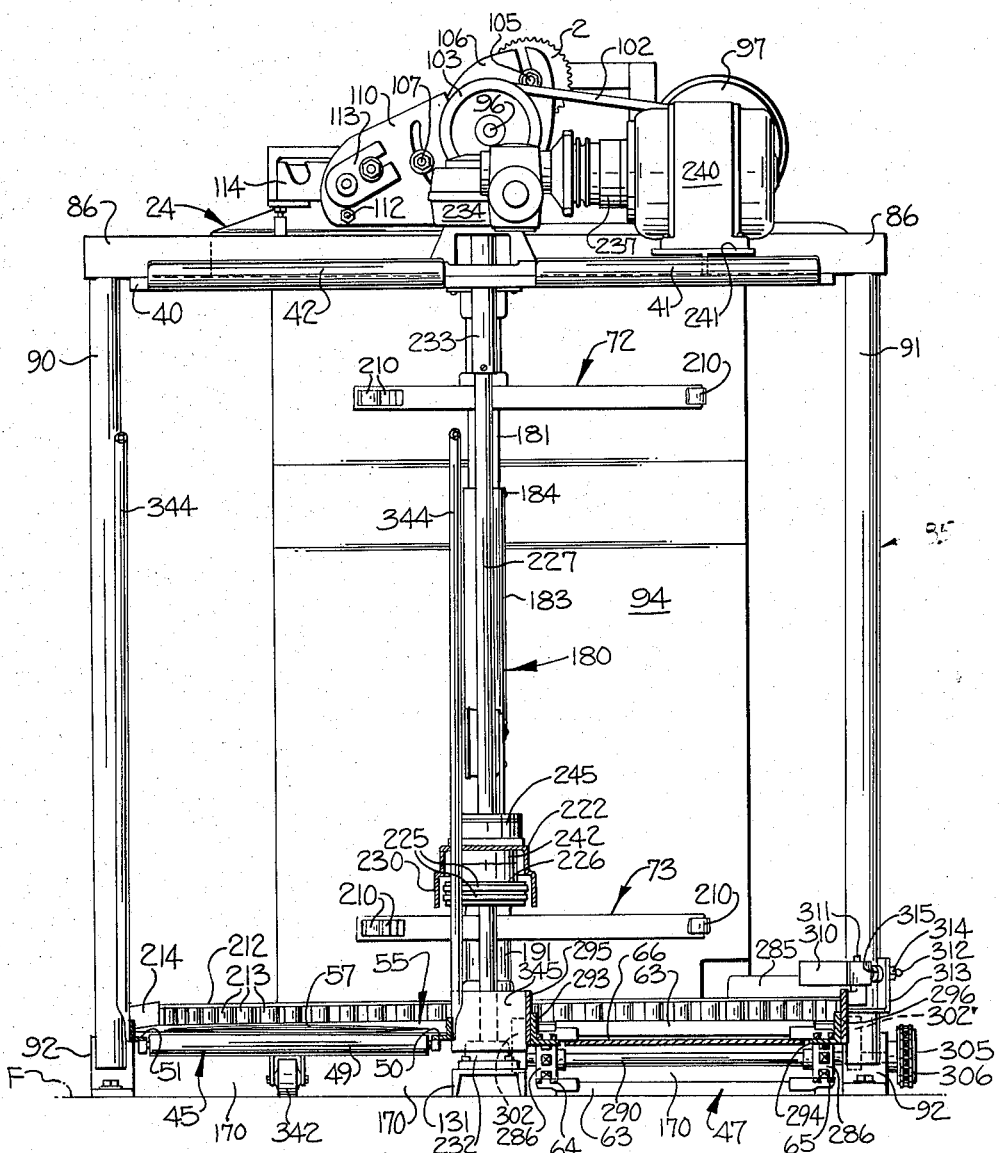

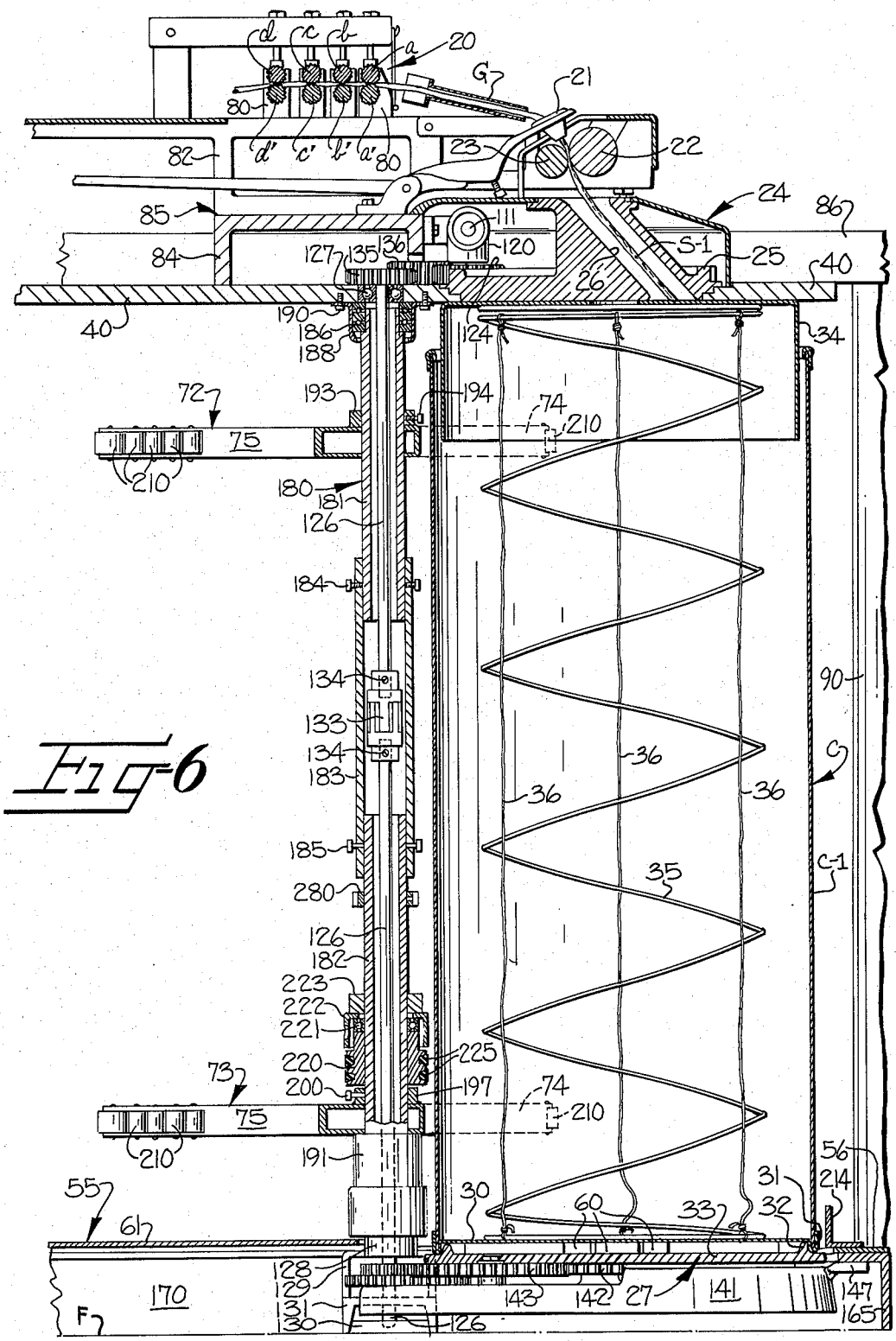

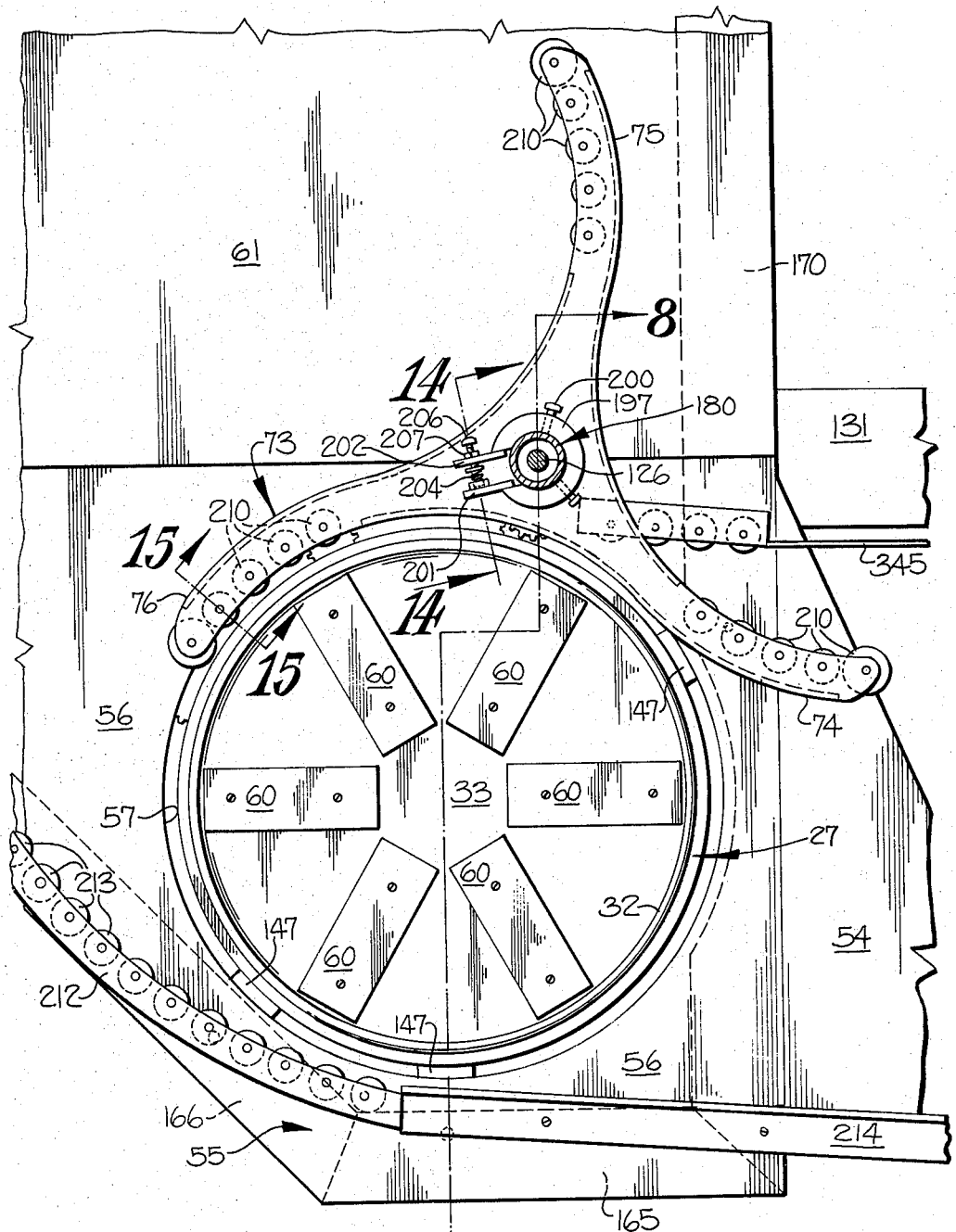

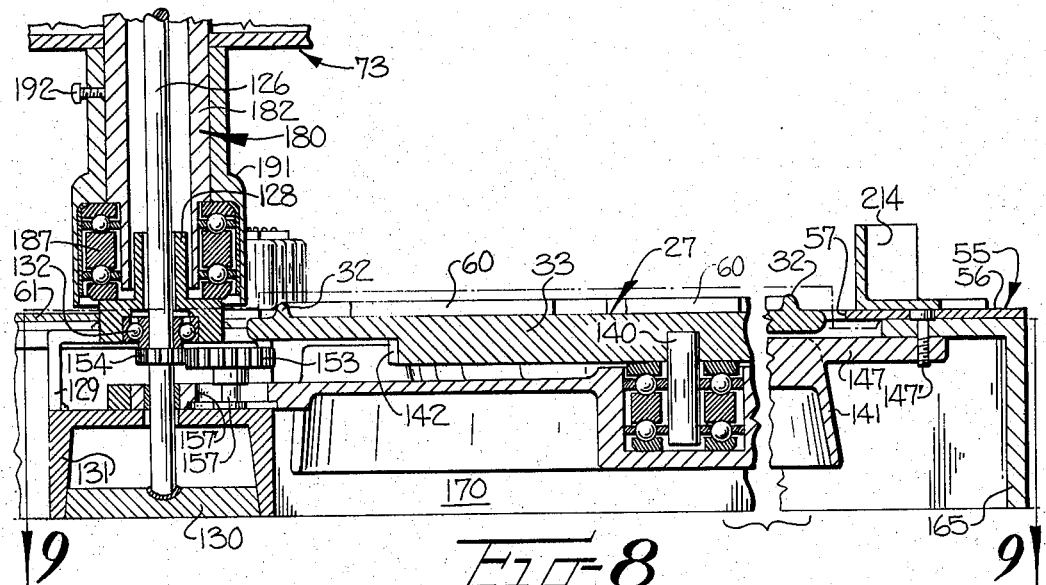
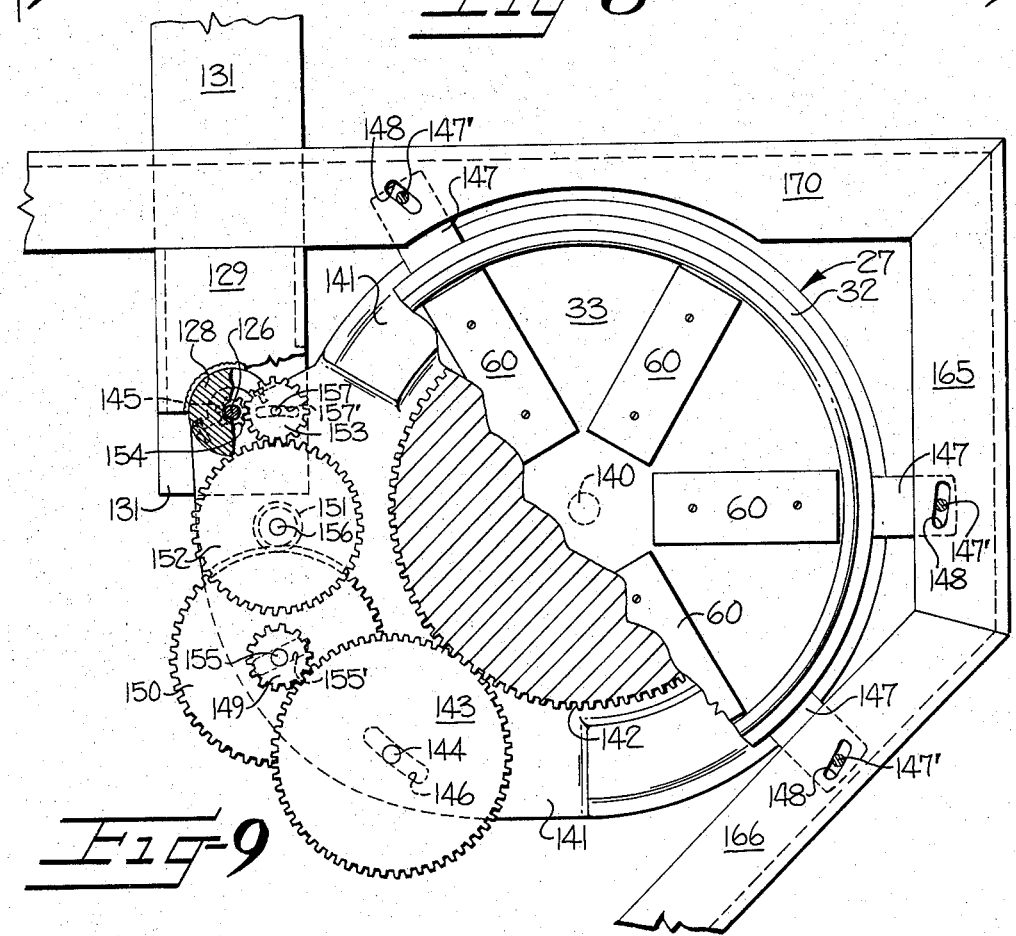

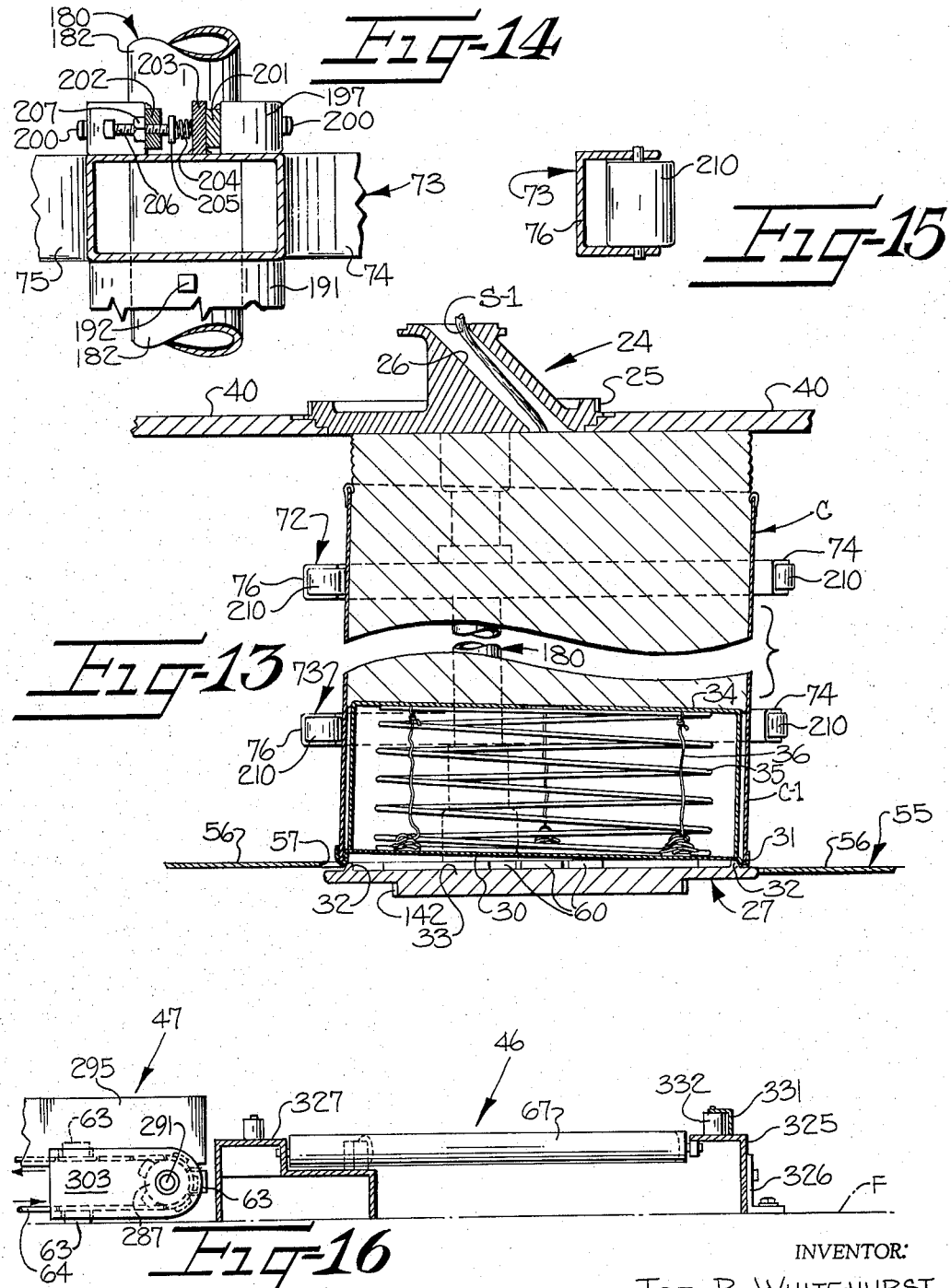

May 10, 1966  J. R. WHITEHURST  3,249,968
APPARATUS FOR DOFFING AND DONNING COILER CANS
Filed March 6, 1963  13 Sheets-Sheet 12
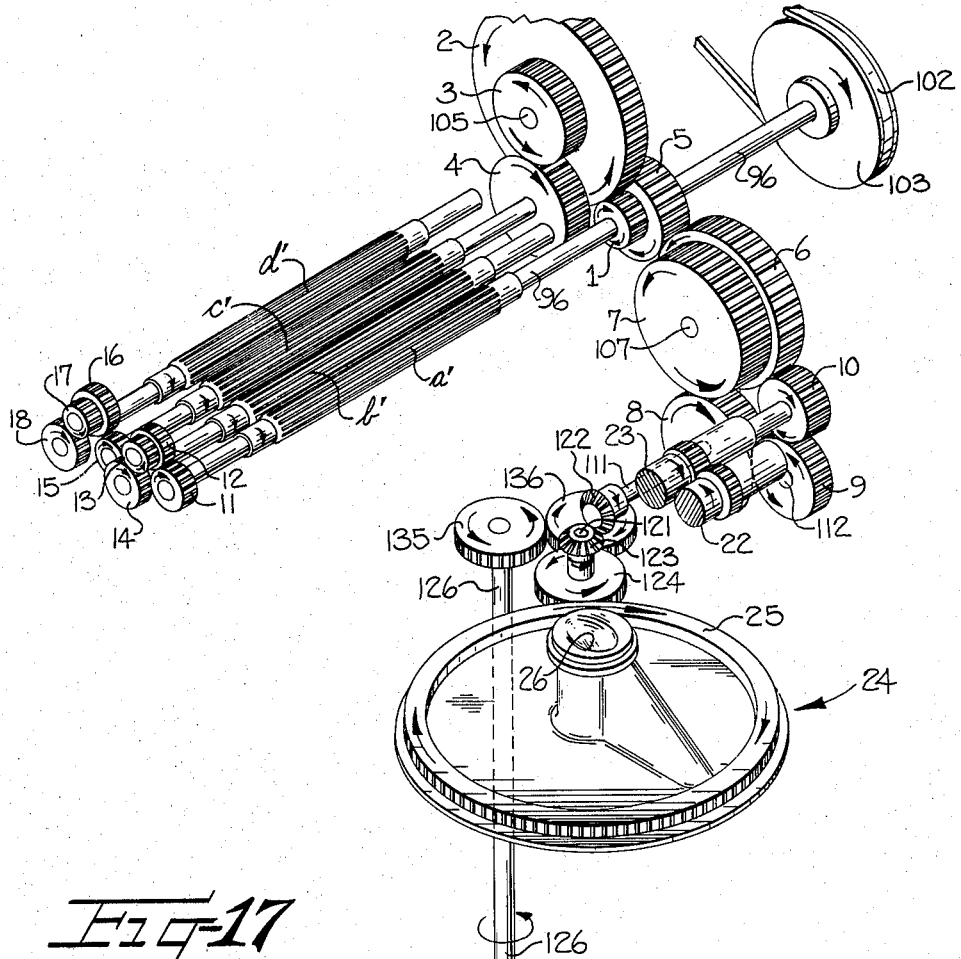
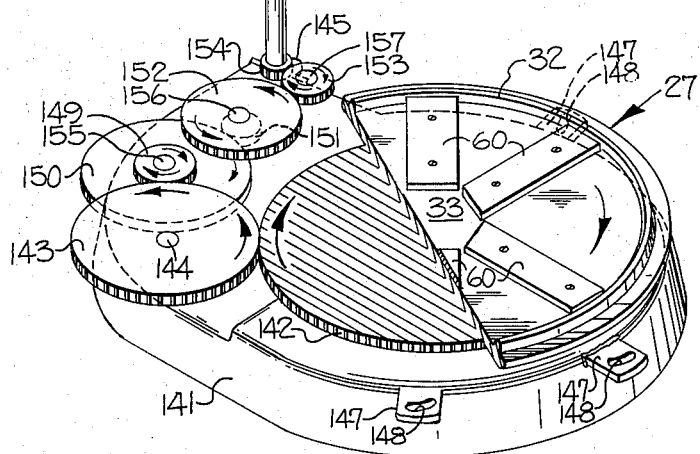
FIG-17

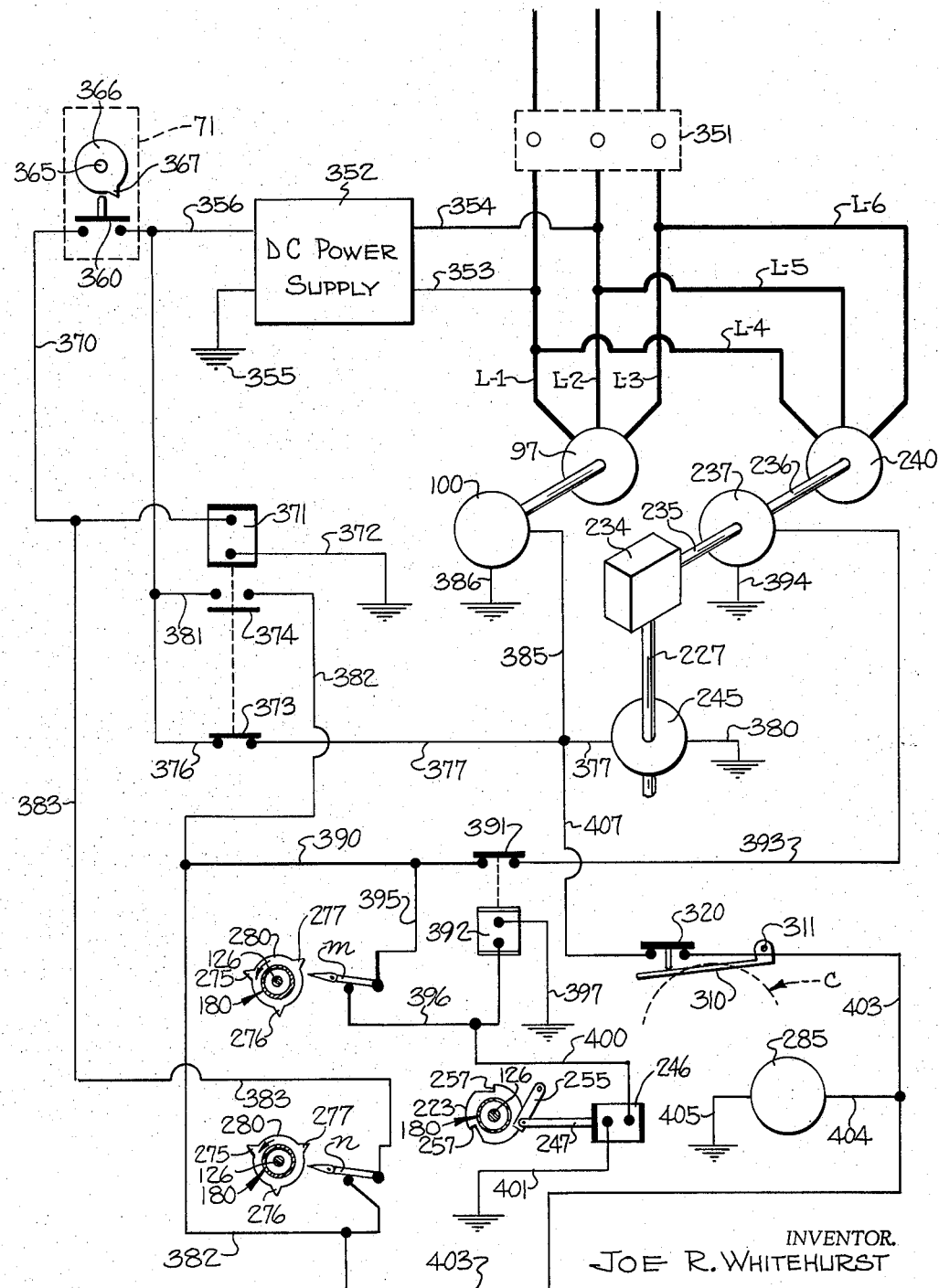

United States Patent Office 3,249,968
Patented May 10, 1966

3,249,968
APPARATUS FOR DOFFING AND DONNING COILER CANS
Joe R. Whitehurst, Bessemer City, N.C., assignor to Ideal Industries, Inc., Bessemer City, N.C., a corporation of North Carolina
Filed Mar. 6, 1963, Ser. No. 263,208
19 Claims. (Cl. 19—159)

This invention relates to a novel method and apparatus for automatically doffing and donning coiler cans of sliver producing machinery such as drawing frames, combing frames, carding machines and the like, and it is an important object of this invention to provide a method and apparatus for automatically transferring successive filled cans from a coiler mechanism and automatically replacing the same with succeeding empty cans, wherein the empty cans are fed from a magazine and move in one direction along a predetermined path throughout successive transferring operations, and wherein the sliver is automatically parted in the course of each transfer operation without the necessity of stopping the machine or interrupting the delivery of sliver therefrom.

It is another object of this invention to provide apparatus for carrying out the present method in which the transfer of each filled can, and the replacement thereof with an empty can, is effected with such efficiency and high speed that only a relatively small amount of residual sliver may overflow between adjacent filled and empty cans during the transfer operation, even though the machine may be producing the sliver at a high rate of speed such as, for example, 1000 feet per minute, and wherein such residual sliver is automatically and rapidly taken up as the filling of the next succeeding empty can commences.

It is another object of this invention to provide a novel method and means for parting the sliver between a filled can and an empty can during the automatic replacement of the filled can with an empty can and wherein each successive filled can is spaced forwardly of the succeeding can positioned beneath the coiler plate, the sliver at the filled can being clamped or restrained thereat and also being clamped between the rotating empty can and the relatively rotating coiler plate so the coiler plate and the empty can coil and take up both the sliver being delivered by the drawing frame and that residual portion of the sliver extending between the can previously filled and doffed and the instant empty can to thus pull taut and ultimately break the portion of the sliver between the cans.

In its preferred embodiment the apparatus for carrying out the method of the present invention is operatively associated with a drawing frame and includes means automatically operable upon a predetermined amount of sliver being coiled into each successive can for transferring the same off the rotating turntable while the upper end of the coiled sliver mass in the filled can impinges against a spectacle plate or the like thereabove and clamps the sliver thereagainst, with means for automatically transferring a succeeding empty can onto the turntable as each successive filled can is transferred therefrom. Each succeeding empty can is provided with a yieldably supported piston or false bottom therein which bears against the spectacle plate and the coiler plate and rotates with the corresponding can and turntable, thereby clamping the sliver against the relatively rotating coiler plate so that both the sliver from the drawing frame and any residual portion of the sliver extending from the preceding can are coiled between the coiler plate and the piston or false bottom until the latter portion of sliver is pulled apart.

Some of the objects of the invention having been stated, other objects will appear as the description proceeds when taken in connection with the accompanying drawings in which—

FIGURE 1 is a front elevation of a single section drawing frame especially adapted for and equipped with the sliver can transferring and handling apparatus of the present invention and showing an empty sliver can immediately following its movement onto the coiler table with a residual portion of the sliver depending, in looped form, between the latter empty can and the preceding filled can;

FIGURES 2 and 2-A are, collectively, an enlarged top plan view of the apparatus shown in FIGURE 1 with the coiler cans being omitted in FIGURE 2-A to better illustrate a portion of a magazine hand truck and feed conveyor;

FIGURE 3 is a plan view partially in section, taken substantially along line 3—3 in FIGURE 1 with most of the coiler cans being omitted and a few of them being shown in phantom lines;

FIGURE 4 is a front elevation of the apparatus looking substantially along line 4—4 in FIGURE 2, but omitting the coiler cans;

FIGURE 5 is a side elevation, partially in section looking at the right-hand side of FIGURE 4;

FIGURE 6 is an enlarged vertical sectional view taken substantially along line 6—6 in FIGURE 4 and showing an empty coiler can positioned on the turntable with its false bottom or piston bearing against the lower surfaces of the coiler plate or tube gear and the spectacle plate;

FIGURE 7 is an enlarged fragmentary plan view, partially in section, taken substantially along line 7—7 in FIGURE 4;

FIGURE 8 is an enlarged fragmentary vertical sectional view similar to the lower portion of FIGURE 6 below the lower indexing spider and being taken substantially along line 8—8 in FIGURE 7;

FIGURE 9 is a fragmentary plan view taken substantially along line 9—9 in FIGURE 8 and showing the gear train between the coiler shaft and the turntable, but omitting the plates of the lower platform;

FIGURE 13 is an enlarged fragmentary vertical sectional view through a filled coiler can showing how the can is tilted preparatory to being slid off the coiler turntable;

FIGURE 14 is an enlarged detail partially in section showing how the lower indexing element or spider is yieldably supported and being taken substantially along line 14—14 in FIGURE 7;

FIGURE 15 is an enlarged fragmentary vertical sectional view through one of the arms of the lower indexing device or spider and being taken substantially along line 15—15 in FIGURE 7;

FIGURE 16 is a fragmentary vertical sectional view through the end roller conveyor taken substantially along line 16—16 in FIGURE 2-A;

FIGURE 17 is a somewhat schematic perspective view of the gearing for driving the drafting rolls and the coiler mechanism;

FIGURE 18 is a schematic diagram of an electrical circuit for controlling the apparatus.

Brief synopsis of the invention

Figure 10:
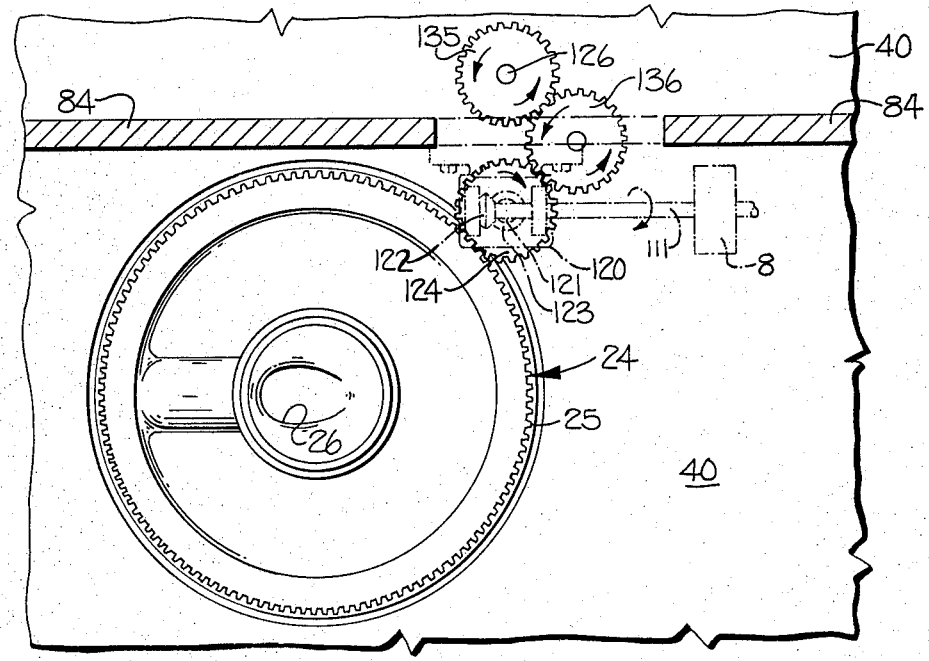
FIGURE 10 is a fragmentary plan view of the coiler head in FIGURE 4, partially in section and showing, in particular, the gearing associated with the tube gear.

The coiler can transferring apparatus for carrying out the method of the present invention may readily be adapted for use with the coiler mechanisms of various types of textile sliver processing machines, but is particularly devised for use with a drawing frame; and more especially, a drawing frame which must operate substantially continuously because of slivers continuously being fed to the drafting zone thereof. An instance in which slivers are continuously directed to a common drafing zone of a drawing frame is that in which the slivers flow directly from a series of carding machines to a common drafting mechanism or zone, or, at least, to a common coiler mechanism which operates at a speed corresponding to the speed at which the slivers are formed by the series of carding machines.

Accordingly, the coiler can transferring apparatus of the present invention is shown in combination with a drawing frame or machine having the usual drafting zone or mechanism broadly designated at 20, and to and through which a plurality of textile slivers or strands S are directed from the suitable source, not shown, and from which the slivers S emerge and are condensed into a single composite sliver or strand S-1 by tubular guide G and a trumpet 21. As is usual, trumpet 21 (FIGURE 6 directs the sliver S-1 to a pair of calender rolls 22, 23 which feed the composite sliver S-1 through a coiler mechanism broadly designated at 24.

Coiler mechanism 24 includes, for example, a conventional tube gear 25 whose lower surface forms a coiler plate and which has an inclined passageway 26 therethrough for directing sliver S-1 into a corresponding coiler can then resting upon and being rotated by a coiler turntable generally designated at 27. Turntable 27 rotates in the same direction as, but at a slower speed than, coiler head tube gear 25. Also, the open lower end of passageway 26 moves in a circular path smaller than the diameter of coiler cans C and eccentrically of turntable 27. Tube gear 25 and turntable 27 may be rotated in opposite directions from each other or in the direction opposite from that shown in FIGURE 17, if desired.

Since a large number of coiler cans are involved in the instant disclosure, they are generally designated at C. However, the coiler can positioned on turntable 27 is specifically designated at C-1 and two coiler cans previously filled with sliver are indicated at C-2, C-3 in FIGURE 1. The remaining empty coiler cans being conveyed to the ingress portion of the transferring apparatus are each designated at C-4 and three of the coiler cans positioned subsequent to that coiler can C-1 then positioned on the turntable 27 are indicated at C-5, C-6 and C-7. The coiler cans are designated in this manner to assist in the description of the operation of the apparatus hereinafter.

Each of the coiler cans C is of the usual cylindrical construction and includes a rigid bottom 30 (FIGURES 6 and 13) having an annular shoulder or downwardly extending flange 31 which is adapted to encircle an annular ridge or shoulder 32 projecting upwardly from the body 33 of the coiler turntable 27. The coiler cans C differ from the usual types of coiler cans in that each is provided with an inverted substantially cup-shaped piston or false bottom 34 having a diameter slightly less than that of the interior of the corresponding coiler can so that it may move freely upwardly and downwardly within the corresponding coiler can. The false bottom or piston 34 is normally urged upwardly by a compression spring 35, the upper end of which bears against the lower surface of the top wall of piston 34 and the lower end of which bears against the bottom wall 30 of the corresponding coiler can.

Suitable means is provided to limit the extent of upward movement of each piston 34 relative to the corresponding can. The latter means is embodied in pliable elements or cables 36 whose opposed ends are suitably connected to upper and lower convolutions of spring 35 or may be connected to the main or rigid bottom 30 and the false bottom or piston 34 of the corresponding coiler can. Although pistons 34 may be lifted off springs 35, the weight of pistons 34 and springs 35 causes them to rotate with cans C whenever the latter are rotated.

The drawing frame includes a main platform 40 which is generally known as a spectacle plate and against the lower surface of which the upper surfaces of the pistons 34 of coiler cans C-1, C-5, C-6, C-7 are yieldably urged by the corresponding springs 35. The tube gear 25 (FIGURE 6) is mounted for rotation in the spectacle plate 40, as is usual, and thus, the piston 34 of the empty can C-1 also is disposed in close proximity to or in engagement with the planar lower surface or coiler plate of tube gear 25. It is apparent that, as the composite sliver S-1 is being directed against the upper surface of the corresponding piston 34 by the tube gear 25 and calender rolls 22, 23, the piston 34 recedes into the can C-1 and the sliver is packed upon the piston 34 so that the piston 34 is moved downwardly to substantially its lowermost position, as shown in FIGURE 13, when the corresponding can C-1 becomes filled with sliver. It is also apparent that the upper surface of the mass of sliver in the can C-1 then yieldably bears against the lower surface of spectacle plate 40.

It should be noted that the cable 36 and spring 35 of each coiler can C are of such length that the pistons 34 project above the level of the lower surface of spectacle plate 40 when such cans are being moved toward spectacle plate 40 by a magazine feed conveyor 47. This insures that successive pistons yieldably press against the spectacle plate 40 when passing therebeneath to turntable 27. Accordingly, an upwardly inclined or curved piston-lowering cam plate 41 is suitably secured to the spectacle plate 40 and overlies the discharge end portion of conveyor 47 to thus engage successively fully raised pistons 34 and cam the same downwardly so they will pass beneath spectacle plate 40.

A cam plate 42 similar to cam plate 41 is also fixed to spectacle plate 40 at the egress portion of the transferring apparatus. Cam plate 42 is also inclined or curved upwardly and outwardly so as to gradually release the pressure applied to the mass of sliver projecting above each successive filled coiler can as it is being transferred from the coiler turntable and therebeyond. This avoids undesirable upsetting of the exposed sliver in each successive filled can.

Referring to FIGURE 1, it will be noted that the can C-2 last filled preceding the positioning of can C-1 on turntable 27 was moved onto a wheeled truck broadly designated at 45 and which, when occupying the position shown in FIGURES 1, 2, 2-A, 3, 4, and 5, forms a part of the magazine including a substantially semi-circular end roller conveyor broadling designated at 46 and the intermittently driven endless conveyor broadly designated at 47. The bottom of hand truck 45 is in the form of a roller conveyor in that it comprises a plurality of longitudinally spaced transversely extending rollers 49 suitably journaled on bottom side frame members or angle bars 50, 51.

Opposed ends of angle bars 50, 51 are spanned by substantially triangularly-shaped transverse bars or plates 52, 53 which preferably extend at an angle to the longitudinal axis of the hand truck 45. Plate 52 is adapted to fit partially beneath a discharge plate or egress plate 54 of a composite base platform or table broadly designated at 55. Platform 55 serves as a raceway upon which corresponding coiler cans C slide during the course of each successive transfer operation. The left-hand edge of egress plate 54 of base platform 55 in FIGURE 3 is suitably connected to the egress end of a downwardly and forwardly inclined intermediate plate 56 of base platform 55. Intermediate plate 56 is provided with an opening 57 therein which is larger than the maximum diameter of each can C. The opening 57 is alined with coiler turntable 27, and may be elongated to facilitate lateral adjustment of turntable 27 relative to tube gear 25 for determining the build of the sliver coiled into each can C.

The inclination of intermediate plate 56 is such that its left-hand portion adjacent turntable 27 is disposed above the level of annular ridge 32 of turntable 27 and its right-hand portion is disposed below or flush with the level of the upper surface of the body 33 defining said ridge 32, as best shown in FIGURE 13. Thus, upon a can C being filled or packed with sliver, the can may readily move off the turntable 27 and across the egress portion of plate 56 and across plate 54 by initially tilting the upper end of the corresponding can toward the truck 45 until the portion of its flange 31 opposite from plate 54 is raised to clear the annular ridge 32 of turntable 27, whereupon the filled can may then be slid off of the turntable 27. It is apparent that the next succeeding empty can C may slide upon plate 56 and drop over ridge 32 because of the inclination of plate 56. In order to insure that the flange 31 of each can C does not become lodged within the confines of the annular ridge 32 of turntable 27, suitable radially extending bars 60 (FIGURES 7 and 9) are positioned in the cavity defined by the annular ridge 32 and are of substantially the same height as ridge 32.

Base platform 55 also includes a plate 61 which, like the plate 56, is of irregular shape. That edge of plate 61 adjacent plate 56, and defining the raceway for the coiler cans, is disposed on a slightly higher level than the corresponding edge of plate 56 so that successive coiler cans may be readily slid from plate 61 onto plate 56.

The magazine feed conveyor 47 comprises a plurality of transversely arranged and longitudinally spaced flight bars 63 whose opposed ends are connected to respective endless sprocket chains 64, 65. A dust-catching plate 66 (FIGURES 3 and 5) may be positioned beneath the upper run of conveyor 47. The upper surfaces of the flight bars 63 at the right-hand portion of endless conveyor 47 (FIGURE 2-A) are disposed on substantially the same level as and move closely adjacent to the upper surfaces of a series of rollers 67 of the arcuate roller conveyor 46.

The ingress end of roller conveyor 46 has an ingress plate or platform 70 thereon above which plate 53 is partially positioned when truck 45 is alined with and positioned between plates 54, 70 (FIGURES 3 and 2-A).

Thus, as each successive can C is moved from left to right on truck 45, the leading can on truck 45 readily moves onto plate 70 and rollers 67 of the roller conveyor 46. Further, the cans are readily advanced from the rollers 67 of conveyor 46 onto the flight bars 63 of the endless conveyor 47. The discharge or front end of the endless conveyor 47 terminates at the ingress portion of the indexing apparatus. Therefore, the upper surfaces of the flight bars 63 in the upper run of conveyor 47, at the left-hand or discharge portion thereof, should be disposed on a level slightly above that of the corresponding edge of plate 61 of platform 55. It can be seen therefore, that each successive empty can C may readily be moved from endless conveyor 47 onto composite platform 55.

In operation, a truck 45 loaded with empty cans C-4 (FIGURE 1) is positioned in alinement with the egress portion of the transferring apparatus, with the transverse plate 52 partially positioned beneath egress plate 54 and the transverse plate 53 partially overlying the ingress plate 70 of arcuate roller conveyor 46. In FIGURE 1, it will be noted that two cans C-2, C-3 have been filled and advanced onto truck 45 and have thus pushed two empty cans C-4 off of truck 45 onto roller conveyor 46. Upon each can, such as can C-2 becoming filled with sliver, a pair of vertically spaced intermittently movable indexing members or spiders 72, 73 (FIGURES 3, 4, 5 and 6) each having three equally spaced curved arms 74, 75, 76 thereon, and being mounted on a common vertical axis, are moved in an indexing stroke which, due to the number of arms thereof, is ⅓ of a revolution in this instance. A suitable self-resetting hank counter or revolution counter 71 (FIGURES 1, 2, 4 and 18) initiates each can-transferring cycle, as will be later described.

Assuming that the arms 74 of spiders 72, 73 are then positioned adjacent the can C-2 then positioned on turntable 27, the upper arm 74 then initially advances the upper portion of the filled coiler can while the lower portion of the coiler can is restrained from being advanced by the annular ridge 32 on the coiler plate 27. Since the lower spider 73 is yieldably mounted, upon the arm 74 of the upper spider 72 advancing the filled can sufficiently so that the trailing portion of the flange 31 clears the ridge 32 on turntable 27, the corresponding arm 74 of the lower spider 73 then advances and catches up with the upper spider 75 as the corresponding filled can C-2 is moved along the platform base 55 and onto the rollers 49 at the corresponding end of the hand truck 45.

It should be noted that the length of the arms 74, 75, 76 is such that the filled can C-2 is then spaced a substantial distance to one side of or to the right of the turntable 27 (FIGURE 3). Also the filled can C-2 will engage and advance a preceding can, such as can C-3, so that a step in movement is imparted to all cans which are located in juxtaposition with respect to each other along the bottom of the truck 45 and along the arcuate roller conveyor 46. End roller conveyor 46 is preferably inclined so that cans C-4 pushed from hand truck 45 onto conveyor 46 may move to driven conveyor 47 by gravity.

As the arms 74 of the spiders 72, 73 advance the can C-2 and move the same off of the coiler turntable 27, the succeeding arms 76 thereof advance the empty can C-1 from an intermediate position along main base platform 55 and move the same onto turntable 27 as a next succeeding empty can C-7 is moved to the intermediate position, preparatory to subsequently being positioned on the turntable 27, by the arms 75 of the spiders 72, 73. Thus, the spiders 72, 73 operate in the manner of a turnstile.

It will be observed in FIGURES 6, 8 and 13 that the outer peripheral surface of ridge 32 on turntable 27 is beveled or tapered so that successive cans readily drop onto, and are readily lifted off turntable 27. Also the tapered configuration of the ridge 32 causes each successive empty can being advanced to turntable 27 by spiders 72, 73 to move away from the corresponding pair of arms 74–76 as the spiders stop moving at the end of each step in rotation thereof, since the spiders 72, 73 stop such movement at the instant the leading portion of the flange 31 on the corresponding coiler can engages the front or right-hand portion of ridge 32 in FIGURES 3, 7 and 13 and the flange 31 then slides over the ridge 32 and away from the corresponding arms of spiders 72, 73.

In order to insure that a can, such as can C-6, is positioned to be subsequently engaged by the arms 74, for example, of spiders 72, 73 with the next succeeding step in rotation thereof, endless conveyor 47 is rendered operative to impart right-to-left movement to any cans then positioned thereon and thus move the can C-6 forwardly and against the rear or convex surfaces of the corresponding arms 75, in this instance, of the spiders 72, 73. In fact, endless conveyor 47 operates while a step in rotation is being imparted to the spiders 72, 73 to thus insure that the next succeeding can C-6 at the ingress portion of the transferring apparatus is properly positioned for engagement by the leading or front surfaces of corresponding rollers carried by the next succeeding arms of the spiders 72, 73. These rollers will be later described.

Conveyor 47 also operates at any time in which there is not a can present at the location occupied by the can C-6 in FIGURES 2 and 3 so that, if a can or cans are positioned on any part of endless conveyor 47, the conveyor 47 advances such cans until the leading can thereon moves to the position in which can C-6 is shown in FIGURES 2 and 3, whereupon the conveyor 47 automatically stops.

During the interim in which the filled can C-2 was transferred off the coiler turntable 27 and the empty can C-1 was transferred onto the turntable 27, the drafting mechanism 20 was still operating and, thus, sliver S-1 was still being fed through the coiler tube gear 25. Textile manufacturers currently operate drawing frames at minimum output speeds of about 450 feet of sliver per minute (about 7½ feet per second) and at maximum output speeds of more than 1000 feet of sliver per minute (17 or more feet per second). The present method and apparatus are particularly devised for coiler mechanisms which feed sliver at a minimum of about 450 feet per minute. Therefore, even though each transfer operation is effected very rapidly; i.e., in from one to two seconds, the linear speed of the sliver S-1 issuing from the coiler plate or tube gear 25 substantially exceeds the speed at which a filled coiler can moves from turntable 27 to the position occupied by can C-2 in FIGURES 1, 2 and 3. For example, a filled coiler can may move less than two feet during each transfer operation, but from seven to thirty-five or more feet of sliver may be fed from the tube gear 25 during each can transfer operation, depending upon the speed of the front drafting rolls $a$, $a'$. It is thus seen that a substantial length of the sliver S-1 accumulates in the form of a residual loop, as shown in FIGURE 1, between the can C-2 previously filled and the empty can C-1 before the empty can C-1 will have become properly positioned on the turntable 27.

Upon completion of and during the transfer operation, the mass of sliver in the can C-2 is urged upwardly and presses against the lower surface of spectacle plate 40, the upper surface of the piston 34 of coiler can C-1 is positioned against or in close proximity to the lower surface of tube gear 25 or its equivalent coiler plate, and the latter piston 34 rotates with the corresponding can C-1 as soon as the can C-1 is properly positioned on the turntable 27. Thus, one end of the looped portion of sliver S-1 is clamped between the mass of fibers projecting above can C-2 and the spectacle plate 40 and its other end portion is clamped between the piston 34 of coiler can C-1 and the spectacle plate 40 as well as the tube gear 25. Since tube gear 25 rotates continuously throughout the operation of the drawing frame and the can C-1 is rotated as soon as it is positioned on the turntable 27, rotation of the corresponding piston 34 against the lower surface of spectacle plate 40 and the tube gear 25 causes the looped portion of the sliver S-1 depending between the adjacent cans C-1 and C-2 to be taken up and coiled against the upper surface of the corresponding piston 34 simultaneously with the coiling of the sliver S-1 moving through the passageway 26 of the tube gear 25 (FIGURE 6). Thus, the residual portion of sliver between cans C-1, C-2 is taken up and pulled taut between the coiler plate and piston 34 of can C-1 and is finally pulled apart.

The foregoing is a general description of essential elements of the apparatus and the operation thereof and a detailed description of the various mechanisms of the apparatus will now be described.

*The drawing frame per se*

As heretofore stated, the drawing frame includes a drafting zone or mechanism 20 and a coiler mechanism 24 which are of generally conventional construction. However, since the operation thereof is closely interrelated with the transferring apparatus of the present invention, a more detailed description thereof will now be given. The drafting mechanism 20 includes four sets of drafting rolls $a$, $a'$; $b$, $b'$; $c$, $c'$; and $d$, $d'$, all of which are shown in FIGURE 6 in the form of fluted rolls. It is apparent, however, that the upper drafting rolls $a$–$d$ may be of the smooth-faced or cushioned type. The drafting rolls $a$–$d$ and $a'$–$d'$ are journaled in the usual manner in roll stands 80 suitably adjustably mounted on laterally spaced roll stand brackets 82 fixed to an upper transverse frame member 84 of a frame broadly designated at 85.

In FIGURE 6, the upper transverse frame member 84 is shown in the form of a channel bar to the lower surface of which spectacle plate 40 is suitably secured. Spectacle plate 40 is also secured to a right-hand transverse frame member 86 to which the right-hand end of the main transverse member 84 is also suitably secured. The front and rear end portions of frame member 86 (FIGURES 2, 4 and 5) extend beyond spectacle plate 40 and are suitably secured to the upper ends of posts 90, 91 whose lower ends have suitable feet or angle clips 92 thereon which rest upon and may be suitably secured to the floor F on which the drawing frame rests. The frame 85 also includes an outside end frame member 94 which is shown in FIGURE 3 as being of hollow construction and which also rests upon the floor F.

The back drafting rolls $d$, $d'$ (FIGURE 6) are driven at a predetermined speed which may, for example, correspond to the speed at which the group of slivers S are being fed thereto from carding machines (not shown). The drafting rolls $c$, $c'$; $b$, $b'$ and $a$, $a'$ are driven at progressively increasing speeds to effect the desired draft to the group of slivers S in the formation of the single composite sliver S-1. Accordingly, it will be observed in FIGURES 2, 5 and 17 that the front bottom drafting roll $a'$ has a main drive shaft 96 connected thereto, or formed integral therewith, which is driven by suitable motive means such as an electric motor 97 suitably supported upon spectacle plate 40.

Main drive shaft 96 is connected through trains of gears to the remaining bottom drafting rolls, the back calender roll 23, the tube gear 25 and the coiler table 27. Although the gear train operatively interconnecting the drafting rolls and the tube gear 25 may be conventional, the means for transmitting rotation to the coiler turntable 27 is especially arranged to accommodate the indexing turnstile of the present invention, as will be presently described.

The electric motor 97 transmits rotation to the main drive shaft 96 through the medium of an electromagnetic clutch 100 (FIGURE 2) which, when energized or activated, rotates a grooved pulley 101 mounted on the shaft of electric motor 97. Pulley 101 is engaged by an endless belt 102 which also engages a grooved pulley 103 fixed on one end of main drive shaft 96. The right-hand portion of main drive shaft 96 in FIGURES 2 and 4 is journaled in a bearing stand 104 fixed to and projecting upwardly from main transverse frame member 84.

The gear train for transmitting rotation from main drive shaft 96 to the bottom drafting rolls $a'$–$d'$ and to the calender rolls 22, 23 includes gears indicated at 1 through 18 (FIGURES 2, 4, 5, 10 and 17). Gears 1, 5 are fixed on main drive shaft 96 and mesh with and impart rotation to respective gears 2, 6. Gears 2, 3 are journaled on a stub shaft 105 adjustably mounted on a fixed change-gear bracket 106 (FIGURES 2, 4 and 5), thus facilitating replacing gears 2, 3 with change gears of different sizes.

Gear 3 meshes with gear 4. Gear 4 is fixed on one reduced end of bottom drafting roll $c'$ for driving the same. Gear 6 is fixed with respect to gear 7. Gears 6 and 7 are also change gears and are journaled on a stub shaft 107 adjustably mounted in a second change-gear bracket 110.

Gear 7 meshes with gear 8 which is fixed on a transverse shaft 111 (FIGURES 2 and 10) for transmitting rotation to tube gear 25 in a manner to be presently described. Gear 8 meshes with gear 9 which is journaled on a stub shaft 112 carried by bracket 110 (FIGURES 4 and 5).

Gear 9 meshes with gear 10 and gear 10 is fixed on one reduced end of the back calender roll 23. The latter reduced end of the back calender roll 23 loosely penetrates bracket 110 and is journaled in a relatively small bracket 113 adjustably mounted on the outer surface of bracket 110. Calender roll 23 is also journaled in a support 114 which is shown as being substantially U-shaped in plan in FIGURE 2 and which also supports front calender roll 22 for rotation therein and for adjustment relative to back calender roll 23. Calender rolls 22, 23 may be arranged in the manner shown in the two embodiments of the apparatus disclosed in my U.S. Patent No. 2,878,527, for example, and, therefore, a further description thereof is deemed unnecessary.

The gears 11, 15 (FIGURE 17) are mounted on reduced corresponding ends of bottom drafting rolls $a'$, $c'$ opposite from respective gears 1, 4 and mesh with the respective gears 12, 13 which are suitably journaled for adjustment relative to the gears 11, 15. Gears 11, 15 have the respective gears 13, 17 respectively rotating in fixed co-axial relation therewith. Gears 13, 17 mesh with the respective gears 14, 18 fixed on reduced corresponding ends of the bottom drafting rolls $b'$, $d'$.

Referring to FIGURE 10, it will be observed that shaft 111 is journaled in a hollow housing or gear casing 120 (FIGURES 6 and 10) suitably secured to the front surface of transverse frame member 84. A substantially vertically disposed shaft 121 is suitably journaled in and projects downwardly from casing 120. Proximal portions of shafts 111, 121 have respective intermeshing bevel gears 122, 123 fixed thereon (FIGURES 10 and 17) and the lower portion of shaft 121 has a spur gear 124 fixed thereon and meshing with teeth in the periphery of tube gear 25, thus imparting rotation thereto.

In conventional drawing frames, a shaft occupying substantially the position of shaft 121 is generally used for transmitting rotation to the coiler turntable. However, since such a shaft would interfere with the transfer of coiler cans to and from turntable 27, a vertically disposed coiler shaft 126 is spaced rearwardly of shaft 121 and is journaled adjacent its upper end in the spectacle plate 40 as by means of an anti-friction bearing 127 (FIGURE 6).

The lower end of shaft 126 extends through a sleeve 128 (FIGURE 8) whose enlarged lower end is fixed to the web of an inverted substantially U-shaped bracket 129 (FIGURES 8 and 9) whose legs are welded or otherwise suitably secured to a transverse frame member 131 resting upon the floor F. The lower end of shaft 126 rests against a block 130 extending between and being fixed to the flanges of frame member 131. Shaft 126 is journaled in sleeve 128 as by means of an anti-friction bearing 132 mounted in the enlarged lower portion of sleeve 128. The portion of transverse frame member 131 remote from side frame member 94 is disposed between the hand truck 45 and the endless conveyor 47 (FIGURE 5). The proximal portions of plates 56, 61 may rest upon bracket 129.

In order to facilitate installation and removal of coiler shaft 126, it may be constructed in two sections whose proximal ends are interconnected by a suitable clutch coupling 133 (FIGURE 6) whose two sections are fixed to the respective upper and lower sections of coiler shaft 126 by any suitable means, such as set screws 134. It is apparent that the two sections of clutch coupling 133 may be moved in telescoping relation to respective sections of shaft 126 to facilitate disconnecting said sections and removing the shaft 126 from or installing the same in the machine.

The upper end of shaft 126 has a gear 135 fixed thereon (FIGURES 6, 10 and 17), as by a press fit, and which meshes with a gear 136 suitably journaled on spectacle plate 40. Gear 136 meshes with gear 124, thus transmitting rotation to coiler shaft 126 whenever main drive shaft 96 is driven (FIGURES 2 and 15).

Referring to FIGURE 8, it will be observed that coiler turntable 27 is fixed to the upper end of a substantially vertically disposed shaft 140 journaled in a turntable support plate 141. A relatively large turntable gear 142 fixed or formed integral with turntable 27 meshes with an idler gear 143 suitably journaled on a stub shaft 144 secured to plate 141 for adjustment along a slot 146 (FIGURE 9) formed in plate 141.

Plate 141 is of irregular shape to accommodate the gear train between coiler shaft 126 and turntable 27. Since turntable 27 should be laterally adjustable to determine the build of the sliver in each can C, the latter gear train is adjustable with coiler turntable 27 and coiler support plate 141 is mounted for adjustment about coiler shaft 126. To this end, it will be observed in FIGURES 8 and 9 that a portion of support plate 141 rests upon transverse frame member 131 and is pivotally mounted on shaft 126.

In this instance, plate 141 is recessed to receive one half the diameter of shaft 126 and is pivotally secured thereagainst by a bearing block 145 (FIGURE 9) suitably removably secured to the corresponding edge of turntable support plate 141. Plate 141 also has a plurality of lugs 147 projecting outwardly therefrom (FIGURES 6 and 9) beneath the horizontal flanges of angle bar frame members 165, 166, 170 which, with frame members 167, 168, and 169, support the base platform plates 56, 61. Screws 147' are threaded into lugs 147 and loosely penetrate arcuate slots 148 extending through plate 61 and the corresponding frame members 165, 166, 170. The slots 148 are generated about the axis of coiler shaft 126.

The gear train between coiler shaft 126 and turntable 27 includes gears 149–154 in addition to turntable gear 142 and idler gear 143. Gears 149, 151 are fixed in coaxial relation to respective gears 150, 152 and are journaled on respective shafts 155, 156. Gear 153 is journaled on a shaft 157 and meshes with gears 152, 154. Gear 154 is fixed on coiler shaft 126. Therefore, one flange of bracket 129 is cut away to accommodate gear 153 as well as that portion of turntable support plate 141 adjacent shaft 126. Shaft 156 is suitably secured to plate 141, but shafts 155, 157 are adjustably secured in respective slots 155', 157' formed in support plate 141, since gears 149, 150, 153 are preferably change gears.

Figure 12:
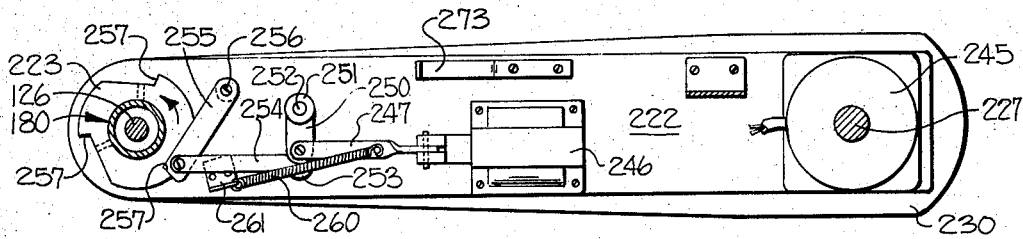
FIGURE 12 is a fragmentary sectional plan view taken substantially along line 12—12 in FIGURE 4 showing the brake associated with the indexing drive shaft and the latch mechanism for locking the indexing members or spiders in indexed position.

The gear train arrangements of FIGURES 9, 10 and 17 are such that turntable 27 rotates in a clockwise direction in FIGURE 17; i.e., in the same direction as and at a slower speed than the tube gear 25. However, turntable 27 may be caused to rotate in the opposite direction from tube gear 25, by deleting or adding a gear or gears to the gear train of FIGURE 9 or FIGURE 12, without departing from the invention.

As heretofore stated, plates 56, 61 of base platform 55 are suitably secured to frame members 165–170. Frame members 165–170 (FIGURE 3) are collectively arranged substantially in accordance with the peripheral outer edges of plates 56, 61 of base platform 55 and may be suitably secured to the floor F, as by means of angle clips 172. The substantially triangular-shaped egress plate 54 of platform 55 may be welded or otherwise suitably secured to the corresponding portion of frame member 170 and may also be suported at its outer or front portion on a frame member 173 welded or otherwise secured to frame member 170 and extending outwardly therefrom (FIGURES 1 and 3). Bracket 129 may also be fixed to the medial portion of frame member 170.

*Coiler can transferring or indexing mechanism*

As heretofore stated, coiler cans C are transferred onto and off of the coiler turntable 27, in succession, by the upper and lower spiders or can transferring members 72, 73. As shown in FIGURES 3–7 and 14, the spiders 72, 73 are mounted on a composite indexing or turnstile shaft broadly designated at 180 and which includes upper, lower and intermediate, telescopically interconnected, tubular sections 181, 182, 183 loosely encircling the coiler shaft 126.

It will be observed in FIGURE 6 that the proximal portions of shaft sections 181, 182 loosely fit within opposed end portions of the center shaft section 183 of indexing shaft 180 and are suitably secured therein as by means of respective set screws 184, 185, thus facilitating installation of and removal of the indexing shaft 180 from the drawing frame and also facilitating relative adjustment of the three sections 181, 182, 183 longitudinally of each other.

The distal ends of shaft sections 181, 182 are journaled in respective radial thrust anti-friction bearings 186, 187. In this instance, upper bearing 186 is mounted in a bearing block 188 secured to the lower surface of spectacle plate 40, as by screws 190. The lower bearing 187 rests upon the enlarged lower portion of sleeve 128 and is mounted in the hollow lower portion of a bearing block 191 (FIGURE 8) which rotates with and is fixed to section 182 of turnstile shaft 180, as by screws 192.

The upper spider 72 is secured in fixed relation to the upper section 181 of composite shaft 180, but the lower spider 73 is yieldably mounted on the lower section 182 of shaft 180. Accordingly, the upper spider 72 has a hub 193 fixed thereon or formed integral therewith (FIGURES 4, 5 and 6) and which is fixed on upper section 181 of shaft 180 by any suitable means, such as set screws 194 (FIGURE 6). The central portion or body of lower spider 73 is loosely penetrated by lower section 182 of shaft 180 and is suported in the desired position on the upper end of bearing block 191.

The lower shaft section 182 also has a split or substantially U-shaped collar 197 suitably secured thereon, as by set screws 200 (FIGURES 6 and 7), and which may be disposed in close proximity to or in engagement with the upper surface of the body of lower spider 73. It will be observed in FIGURES 7 and 14 that split collar 197 has a pair of outwardly extending arms 201, 202 suitably secured thereto, or which may be formed integral therewith, and which loosely straddle a stop projection or abutment 203 suitably secured to or formed integral with the body of lower spider 73. Abutment 203 is normally urged against arm 201 by a compression spring 204 which bears against a disk 205 on the corresponding end of an adjustment screw 206 threaded through arm 202. Adjustment screw 206 may be locked in the desired adjusted position by a lock nut 207.

It is thus seen that lower spider 73 may remain stationary during an initial portion of a step in counter-clockwise rotation of composite shaft 180 in the event of the spider 73 being restrained from rotation with shaft 180 by engagement of any one of its arms, such as arm 76 in FIGURES 3 and 7, with a coiler can positioned on turntable 27. However, since the upper spider 72 is fixed with respect to section 181 of shaft 180, the upper portion of the corresponding coiler can is tilted by the corresponding arm of upper spider 72 until the flange 31 on the corresponding can C is raised above annular ridge 32 on coiler table 27 (see FIGURE 13). Thereupon, spring 205 causes the lower spider 76 to advance quite rapidly until abutment 203 (FIGURES 7 and 9) again moves into engagement with the arm 201 of collar 197; i.e., until lower spider 73 catches up with upper spider 72, thus removing the corresponding coiler can, such as can C–1, from turntable 27.

In order to permit freedom of rotation of the coiler cans C relative to the correspondiing arms 74–76 of spiders 72, 73 during each transfer or indexing operation without marring the surfaces of the coiler cans then alined with corresponding arms 74–76, each of the arms 74–76 of each spider 72, 73 is substantially C-shaped in cross section and has a plurality of rollers 210 journaled therein (FIGURES 7 and 15) there being five such rollers shown in association with each arm 74–76 in FIGURE 7. The outer surfaces of rollers 210 project outwardly relative to the flanges of the corresponding arms 74–76 and are also arranged in an arc preferably corresponding substantially to the curvature of the peripheries of the collar cans C.

The outermost roller 210 in each arm 74–76 is preferably of larger diameter than the others and also projects outwardly beyond the free end of the corresponding arm so the coiler cans will not be marred by the free ends of the arms of the spiders 72, 73 when they occupy the relative positions in which coiler can C–2 and arm 74 are shown in FIGURE 3, for example. In other words, the outermost of the rollers 210 engages each successive can not only while the corresponding coiler can is nested in the corresponding arcuate arms, but also while the corresponding can is being directed out of the arcuate concave leading surfaces of the corresponding arms of the spiders 72, 73.

In order to maintain successive coiler cans C in engagement with the rollers 210 of corresponding arms 74–76 of spiders 72, 73 during the successive transfer operations, a substantially semicircular guide track 212 is suitably secured to the upper surfaces of the plates 56, 61 of base platform 55. The guide track 212 is also substantially C-shaped in cross section and has a plurality of closely spaced rollers 213 journaled between the flanges thereof substantially throughout the length thereof. The rear portion of guide track 212 is spaced rearwardly of the axis of spiders 72, 73 a substantially greater distance than the front portion thereof adjacent the coiler table 27 to facilitate ease in directing successive coiler cans C onto the ingress platform 61 and to subsequently guide the cans inwardly toward the axis of spiders 72, 73 during successive transferring operations so that each successive can is properly alined with the turntable 27 upon being directed thereto by the spiders 72, 73.

The front portion of guide track 212 terminates substantially radially and forwardly of turntable 27 and a guide track extension bar 214 extends from the front free end of guide track 212 to a point adjacent the free end of egress plate 54 of base platform 55. Guide track extension 214 may also be suitably secured to the upper surfaces of plates 54, 56 of base platform 55.

*Drive for transfer mechanism*

Referring to FIGURES 4, 5 and 6, it will be observed that a grooved pulley 220 is fixed on the lower section 182 of the turnstile shaft 180 preferably at a point spaced closely above or in engagement with the split collar 197. An anti-friction bearing 221 (FIGURE 4), whose inner race is fixed to lower section 182 of shaft 180, supports the inner portion of a control frame member 222 thereon. In this instance, control frame member 222 is shown in the form of a channel bar in FIGURES 5 and 6 and is loosely penetrated by the lower section 182 of composite shaft 180.

A locking ratchet wheel 223 is suitably secured to the lower section 182 of shaft 180 immediately above the web portion of channel bar 222. Pulley 220 and ratchet wheel 223 may rotate relative to control frame member 222 because the latter is supported by shaft 180 and bearing 221 in a fixed position with respect to the frame 85 of the drawing frame.

Grooved pulley 220 is engaged by a pair of endless belts 225 which extend outwardly away from the upright frame member 94 and beyond base platform 55 and are mounted on a sprocket wheel 226 fixed on a substantially vertically disposed or upright indexing drive shaft 227 (FIGURES 4 and 5). A suitable shield 230, of inverted U-shaped cross-section, may enclose the endless belts 225 and grooved pulleys 220, 226. In this instance, only a portion of shield 230 is shown depending from and being suitably secured to the control frame member 222. The shield 230 is shown in plan in FIGURE 12.

It will be observed in FIGURE 3 that shield 230 is wider at its outer portion than it is at the indexing or turnstile shaft 180 so as to serve as a guide for corresponding portions of the can C as they are approaching and leaving the spiders 72, 73.

The lower end of indexing drive shaft 227 is journaled in a bearing block 232 suitably secured to the upper surface of the outer portion of channel bar 131 (FIGURES 4 and 5). The upper end of shaft 227 is suitably connected to the output shaft 233 of a gear reduction unit 234 suitably secured to spectacle plate 40 (FIGURES 1, 2, 4 and 5). The input shaft 235 of gear reduction unit 234 as adapted to be operatively connected to a driven shaft 236 by a clutch mechanism 237 of conventional or other construction and which is of the electromagnetic type in this instance.

Shaft 236 or the driving element of the clutch 237 may be driven by the main electric motor 97, if so desired. However, in this instance, clutch 237 serves to couple the input shaft 235 of gear reduction unit 234 to shaft 236 which is driven by an indexing electric motor 240. Electric motor 240 is suitably secured to a motor base plate 241 fixed on the rear portion of spectacle plate 40.

Since the construction and operation of electromagnetic or electrically operable clutches are generally well known a detailed illustration and description of each of the clutches 100, 237 (FIGURE 2) is deemed unnecessary. For example, the clutches 100, 237 may be of a type such as is disclosed in my copending application Serial No. 243,360, filed December 10, 1962, and entitled Method and Means for Controlling the Output of a Textile Drafting Mechanism, and as manufactured by Starns Electric Corporation, Milwaukee 2, Wisconsin, under their number 5.5–SMR, and as illustrated on their drawing number C3105–J dated May 17, 1961.

It will be observed in FIGURES 4 and 5 that an antifriction bearing 242, whose inner race is fixed on shaft 227, engages the lower surface of the web of control frame member 222 for supporting the same. The upper surface of the outer portion of control frame member 222 has the stator of an electrically operable or electromagnetic brake 245 fixed thereto, the rotor of brake 245 being fixed on the indexing drive shaft 227. Brake 245 may be of substantially the same construction as clutches 100, 237.

A medial portion of control frame member 222 has the coil of a solenoid 246 fixed on a medial portion thereof (FIGURES 3, 4, 12 and 18). The plunger of solenoid 246 has one end of a link 247 connected thereto whose other end is pivotally connected to a crank 250. Crank 250 is fixed to an upright sleeve 251 journaled on a shaft 252 suitably secured to and projecting upwardly from control frame member 222. The lower portion of sleeve 251 has another crank 253 thereon to which the outer end of a link 254 is pivotally connected. The other end of link 254 is pivotally connected to a locking pawl 255 pivotally mounted on control frame member 222, as at 256.

Pawl 255 is adapted to successively engage three shoulders, teeth or notches 257 formed in the periphery of locking ratchet wheel 223. The notches 257 are so positioned with respect to the pawl 255 and the spiders 72, 73 that one of the notches 257 engages the pawl 255 whenever a corresponding arm 74, 75 or 76 of each spider 72, 73 is accurately positioned with respect to the annular ridge 32 of turntable 27, so that the flange 31 of the corresponding coiler can C is then properly positioned on the turntable 27 as heretofore described (see FIGURES 3, 6, 7 and 13). The latch 255 is urged toward locking wheel 223 by a tension spring 260 (FIGURE 12) the outer end of which is suitably connected to link 247 and the other end of which is connected to a spring anchor 261 embodied in an angle clip suitably secured to control frame member 222.

Spaced above control frame member 222 in FIGURE 4 is a pair of normally closed limit switches 271, 272, the housings of which are suitably secured to a standard 273 suitably secured to and projecting upwardly from control frame member 222. Switches 271, 272 have respective actuator arms m, n thereon which are adjustable relative to each other and relative to the respective switches 271, 272 so that the switch actuator arms m, n may be successively engaged by each of three equally circularly spaced abutments or projections 275, 276, 277 on a cam wheel 280 (FIGURES 4, 6, 11 and 18) suitably secured to the lower section 182 of turnstile shaft 180, as by screws 281.

The projections 275–277 on cam 280 are so arranged with respect to the arms 74–76 of spiders 72, 73 that one of the projections 275–277 will engage switch actuator m to open switch 271 and will then engage actuator n to open switch 272 and will come to rest at the instant a can C slips over ridge 32 on turntable 27; i.e., immediately after the corresponding projection on cam 280 has moved out of engagement with switch actuators m, n. As will be later described, the momentary opening of limit switch 271 by engagement of any one of the projections 275–277 of cam 280 with actuator m therewith, will deactivate electromagnetic clutch 237 and permit indexing drive shaft 227 to idle momentarily as the composite shaft 180 and spiders 72, 73 also idle and move in a counterclockwise direction in FIGURE 3. The opening of switch 271 also deactivates solenoid 246, thus permitting spring 260 to move latch 256 into engagement with the periphery of locking wheel 223.

The opening of limit switch 272 by momentary engagement of actuator n by any one of the projections 275–277 then energizes and actuates electromagnetic brake 245 to stop rotation of shafts 227, 180 and spiders 72, 73 at the instant at which a corresponding tooth or shoulder 257 (FIGURE 12) on wheel 223 engages latch 256 and also at the instant at which a corresponding coiler can C slips over ridge 32 and is properly positioned on turntable 27.

The momentary opening of limit switch 272 at the end of each can transferring operation also breaks the circuit to an electric motor 285 (FIGURES 2, 3 and 5) which drives the main endless feed conveyor 47 during each can transferring operation and which also drives conveyor 47 whenever a coiler can is not positioned at the ingress portion of the transferring mechanism; i.e., closely adjacent to or in engagement with the rear surface of any of the arms 74–76 of spiders 72, 73 which may then be projecting rearwardly from the composite shaft 180. The electrical circuit for the various electrical components heretofore described will be later described.

*Magazine feed conveyor*

In the present embodiment of the apparatus of the present invention, the magazine for storing empty cans and receiving filled cans from the turntable 27 includes the hand truck 45, the arcuate or substantially semicircular end roller conveyor 46 and the endless feed conveyor 47, as heretofore stated. It is contemplated, however, that empty cans may be directed to the ingress portion of the transferring apparatus, rearwardly of the control frame member 222 and may be directed away from the front discharge or egress portion of the transfer mechanism by suitable elevators or respective lowering and lifting devices, not shown. However, the novel arrangement of the magazine disclosed in the present drawings is desirable for the intended purpose.

As heretofore stated, the main feed conveyor 47 includes the flight bars 63 carried by the endless sprocket chains 64, 65 (FIGURES 2, 2–A, 3, 5 and 7). The front and rear or discharging and receiving end portions of endless sprocket chains 64, 65 are mounted on respective pairs of sprocket wheels 286 (FIGURE 5) and 287 (FIGURE 2–A) fixed on respective shafts 290, 291. The upper runs of sprocket chains 64, 65 rest upon and move in engagement with the inwardly projecting flanges of respective longitudinally extending angle bars 293, 294 whose upwardly extending outer flanges have respective guide rails or plates 295, 296 welded or otherwise suitably secured thereto and extending longitudinally thereof.

The guide rails 295, 296 maintain corresponding coiler cans C in proper alinement with conveyor 47 as they are being advanced by the flight bars 63. The angle bars 293, 294 and guide rails 295, 296 are supported on suitable legs 300, 301 welded or otherwise suitably secured to the guide rails 295, 296 and resting upon the floor F (FIGURES 2–A and 3). The front and rear conveyor shafts 290, 291 are journaled in bearing blocks 302, 303 and 302', 303' suitably secured to guide rails 295, 296 of conveyor 47 (FIGURES 2–A and 5).

The shaft 290 at the discharge end of conveyor 47 has a sprocket wheel 305 fixed on the rearmost end thereof with respect to the drawing frame. Sprocket wheel 305 is engaged by a sprocket chain 306 which also engages a sprocket wheel 307 fixed on the shaft of electric motor 285. Electric motor 285 may be suitably secured to frame 85, but is shown in FIGURE 2 as being suitably secured to the floor F.

As coiler cans C move from the flight bars 63 of conveyor 47 onto the ingress portion of plate 61 of base platform 55, they are urged forwardly against the rear surface of the shield 230 by a spring-loaded arm 310 so as to assist in alining such cans with the next succeeding arms 74, 75 or 76 of the spider 72, 73 (FIGURES 2, 3 and 5). The portion of arm 310 remote from platform 55 is pivotally mounted, as at 311, on the guide rail 296. A medial portion of arm 310 has the front end of a link 312 pivotally connected thereto which loosely penetrates the upstanding leg of a substantially L-shaped bracket 313 (FIGURE 5) and has an adjustment nut 314 threaded on the free end thereof which is normally urged into engagement with the upright portion of angle bracket 313 by a compression spring 315.

Compression spring 315 surrounds link 312 and one end thereof bears against the loaded arm 310. The other end of spring 315 bears against the front or inner surface of the vertical leg of bracket 313, thus normally urging the free end of arm 310 inwardly toward guide rail 295 and shield 230. In the absence of a coiler can, such as can C–6 of FIGURES 2 and 3, being positioned with a portion thereof resting upon plate 61 and another portion resting upon one or more of the bars 63 of conveyor 47, a normally closed conveyor switch 320 maintains the flow of electrical energy to conveyor motor 285. However, switch 320 is provided with an actuating arm 321 which is moved by each successive can C as it moves onto plate 61 and into engagement with the corresponding arms of the upper and lower spiders 72, 73. In so doing, switch actuator arm 321 is moved from the position of FIGURE 3 to that of FIGURE 2 to open switch 285 and to normally break the circuit to the conveyor motor 285.

*End roller conveyor and hand truck*

As heretofore stated the end roller conveyor 46 of FIGURES 2–A and 16 is substantially semi-circular in plan and includes an ingress plate 70 for receiving each successive coiler can C from the hand truck 45 and for directing such cans onto a plurality of arcuately arranged rollers 67 which, in turn, direct successive cans onto the endless main feed conveyor 47. The radially outward ends of the conveyor rollers 67 are suitably journaled on an arcuate or semi-circular frame member 325 suitably secured to the floor F by a plurality of arcuately spaced angle clips 326. The radially inward ends of rollers 67 are suitably journaled on a fixed hub 327 which may also be suitably secured to the floor F.

The hub 327 has an inwardly projecting angle bar 330 suitably secured thereto for supporting the rear portion of plate 70 and to also assist in guiding successive coiler cans C from the hand truck 45 onto rollers of the substantially semi-circular end conveyor 46. The upper surface of frame member 325 has a substantially semi-circular guide track 331 suitably secured thereto and in which a plurality of closely spaced rollers 332 are suitably journaled for guiding the coiler cans during their movement upon the rollers 67 from the ingress plate 70 of end roller conveyor 46 and onto the endless feed conveyor 47.

As heretofore stated, the hand truck 45 has a bottom formed of the conveyor rollers 49 journaled in the side frame members 50, 51 and these members 50, 51 also support the end plates 52, 53 therebetween. Medial portions of the side frame members or angle bars 50, 51 have respective swiveling casters 340, 341 suitably secured thereto. The end plates 52, 53 also have respective end swiveling casters 342, 343 suitably secured thereto (FIGURES 1, 2–A, 3 and 5). The end casters 342, 343 are preferably of lesser height than the central casters 340, 341 to permit a slight rocking movement of the hand truck 45 on the central casters 340 and 341 and to thus permit the plate 52 to be partially positioned beneath the egress plate 54 of the base platform 55 and to permit the plate 53 to be partially positioned above and in engagement with the ingress plate 70 of the arcuate roller conveyor 46.

This permits successive cans C to be pushed from egress plate 54 onto the plate 52 of truck 45 and also permits successive cans C to be pushed from the plate 53 onto plate 70 without being encumbered by the adjacent plates. The hand truck 45 may be provided with suitable raised side rails 344 on opposite sides thereof to prevent coiler cans from falling off hand truck 45 as they are being moved from place to place.

In order to assist in properly positioning the truck 45 between the plates 54, 70 (FIGURES 3 and 2–A, respectively), an elongate stop plate 345 is suitably secured adjacent one end thereof to frame member 169 in substantially the same vertical plane as the corresponding front side of shield 230. The other end of stop plate 345 converges toward guide rail 295 of conveyor 47 and is suitably secured thereto, as by welding (FIGURES 2, 3 and 5). The inner or rear surface of angle bar 330 (FIGURE 2–A) also has a suitable stop member 347 suitably secured thereto against which the corresponding frame member 50, of truck 45 may be positioned.

*Electrical circuit*

In FIGURE 18, a suitable electrical circuit is shown for effecting operation of the various electrical components of the present apparatus in the desired sequence. In this instance, the main drive motor 97 and the indexing drive motor 240 have respective sets of three wires or conductors L–1, L–2, L–3 and L–4, L–5, L–6 extending therefrom, thus indicating that these motors 97, 240 may be of the alternating current 3-phase type, as would generally be desirable. Conductors L–4, L–5, L–6 extend from indexing drive motor 240 to the respective conductors L–1, L–2, L–3 which, in turn, extend to a suitable source of electrical energy, not shown. Conductors L–1, L–2, L–3 may have suitable "start," "stop" and "jog" switches interposed therein. Since the latter switches are of well-known construction, they are collectively designated at 351 in the upper portion of FIGURE 18.

The control circuit of the present invention is preferably operated on a relative low voltage and, therefore, a D.C. or direct current power supply 352 serves as the source of energy for the various electrical components of the control circuit, in the present instance. Power supply 352 has a pair of conductors 353, 354 leading therefrom to the respective conductors L–1, L–2. One side of the output of power supply 352 is grounded, as at 355 and the other side thereof has a conductor 356 leading therefrom to one side of a normally open switch 360 which may be a part of the self-resetting hank counter or revolution counter 71.

As shown in FIGURES 1, 2, and 4, the housing of counter 71 is suitably secured to the upper end of the main side frame member 94 and to spectacle plate 40 by suitable brackets 361, 362. The input shaft *p* of counter 71 is driven throughout the operation of the coiler mechanism 24, by any suitable means such as a train of gears generally designated at 364, which connect the input shaft p of counter 71 with the back calender roll 23 (FIGURES 2 and 4).

Various types of revolution and hank counters are readily available for the intended purpose and, accordingly, a detailed illustration and description of the counter 71 is deemed unnecessary. One type of counter which has served well for the present purpose is of a type manufactured by J. Hengstler KG, Aldingen, Kreis Tuttlingen, Germany and is disclosed on pages 36–39 in their catalog entitled Hengstler Counters, which pages particularly refer to revolution counters with continuous automatic repetition of a selected number and with automatic contact every time the chosen number has been reached (repeater counter). The counter 71 may be of the type identified by part numbers UW 091 and UW 096 in said catalog. In any event, the counter 71 should be of a type which will automatically momentarily close the switch 360 (FIGURE 18) and then permit the switch 360 to open each time a predetermined amount of sliver has been packed into the corresponding can, such as can C–1.

Accordingly, the counter 71 is shown schematically in FIGURE 18 as including a shaft 365 which rotates a complete revolution during the filling of each successive coiler can C with the desired amount of sliver. In this instance, shaft 365 has a cam wheel 366 fixed thereon which is provided with a lobe or projection 367. Projection 367 momentarily engages and closes switch 360 upon the filling of each successive can C being completed to the desired extent, whereupon the lobe 367 moves out of engagement with switch 360 and permits the same to reopen.

When closed, switch 360 establishes contact between conductor 356 and a conductor 370 which extends from switch 360 to one end of the coil of a main electromagnetic relay 371. The other end of the coil of relay 371 has a conductor 372 leading therefrom to ground. Relay 371 includes two relay switches 373, 374 which normally occupy the positions shown in FIGURE 18 when relay 371 is deenergized. Thus, switch 373 normally maintains contact between a pair of conductors 376, 377. Conductor 376 leads from one side of switch 373 to conductor 356, and conductor 377 leads from the other side of switch 373 to one side of the coil of electromagnetic brake 245, which is then grounded through a conductor 380 connected to ground.

When the coil of main relay 371 is energized by the closing of switch 360, switch 373 is opened and switch 374 is closed. Switch 374 then establishes contact between a pair of conductors 381, 382, the conductor 381 being connected to conductor 376 and the conductor 382 extending from switch 374 to one side of the normally closed limit switch n.

Figure 11:
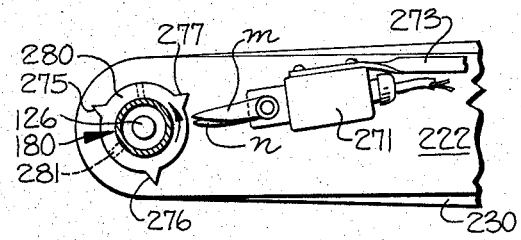
FIGURE 11 is an enlarged fragmentary sectional plan view taken substantially along line 11—11 in FIGURE 4 and showing the means for operating the indexing limit switches.

Since the momentary closing of switch 360 initiates a cycle in the operation of the transfer or indexing mechanism and it is necessary to maintain energization of the coil of relay 371 after switch 360 has reopened and throughout the remainder of the indexing or transfer cycle, the limit switch n has a conductor 383 connected to the opposite side thereof from conductor 382 and leading to conductor 370. Thus, current then flows from conductor 356, through conductors 376, 381, switch 374, conductor 382, switch n, conductors 383, 370, the coil of relay 371 and conductor 372 to ground, thus maintaining energization of the coil of relay 371 until switch n is momentarily opened by a corresponding projection 275, 276 or 277 on the cam wheel 280 (FIGURE 11).

Although the drafting rolls a–d, a'–d', calender rolls 22, 23, tube gear or coiler plate 25 and turntable 27 continue to rotate during each can transfer operation, it is desirable from a standpoint of safety, to permit the latter elements to idle or coast during each can transfer operation so that the latter elements will ultimately come to a standstill in the event that some malfunction of the control circuit accidentally occurs during any can transfer operation. Therefore, it will be observed in FIGURE 18 that conductor 377 has a conductor 385 leading therefrom to one side of the coil of the main electromagnetic clutch 100, the other side of the latter coil being connected to ground by means of a conductor 386. Thus, since switch 373 of relay 371 is opened upon each successive can transfer operation being initiated, it is apparent that the flow of current to the main electromagnetic clutch 100 is interrupted simultaneously with deenergization of the coil of electromagnetic brake 245.

It is to be noted, however, that the drive for the drafting mechanism 20, the coiler mechanism 24 and turntable 27 is interrupted through deenergization of main clutch 100, only for the purpose stated above and, since each can transfer operation is effected within a period of from one to two seconds (one and one-half seconds in actual practice), the inertia of the rotating and idling drafting rolls, upon being disconnected from the main drive, is such that there is very little reduction in the speed thereof during each successive can transfer operation so that the linear speed of the sliver issuing from the coiler plate or tube gear 25 during each can transfer operation is substantially the same as it is during the filling of each successive can C with sliver. In practice, it was determined that when the normal linear speed of sliver S–1 issuing from coiler plate 25 was 800 feet per minute, this was ultimately reduced to approximately 600 feet per minute during a one and one-half second interval of a can transfer operation.

It is apparent that the coil of electromagnetic brake 245 is deenergized in the aforesaid manner upon initiation of each can transferring operation so that indexing drive shaft 227 may be driven to effect the can transfer operation. Accordingly, the closing of switch 374 by energization of the coil of relay 371 energizes the coil of secondary or indexing electromagnetic clutch 237. To this end, it will be observed in FIGURE 18 that conductor 382 has a conductor 390 connected thereto and extending to one side of a normally open switch 391 of an electromagnetic relay 392.

The other side of switch 391 has a conductor 393 leading therefrom to one end of the coil of electromagnetic clutch 237, the other end of the latter coil being connected to ground by a conductor 394. Although switch 391 of relay 392 is normally open, the coil of relay 392 is energized upon switch 374 of relay 371 being moved to closed position, as will be presently explained, and it is thus seen that the coil of electromagnet clutch 237 is then energized as current flows from conductor 356, through conductors 376, 381, switch 374, conductors 382, 390, switch 391, conductor 393 the coil of electromagnetic clutch 237 and conductor 394 to ground.

It will be noted that the coil of relay 392 was energized upon switch 374 being moved to closed position because conductor 390 has a conductor 395 leading therefrom to one side of the normally closed limit switch m. The other side of switch m has a conductor 396 leading therefrom to one side of the coil of relay 392, and the other side of the latter coil is grounded through a conductor 397.

As heretofore stated, upon energization of the coil of clutch 237, rotation is imparted to indexing drive shaft 227 to impart a step in rotation to composite shaft 180, spiders 72, 73 and switch actuating cam 280 in the manner heretofore described. However, before indexing drive shaft 227 can impart a step in rotation to the spiders 72, 73, it is apparent that latch 255 must be released from engagement with the corresponding notch 257 on ratchet wheel 223. Therefore, it will be observed in the lower portion of FIGURE 18 that the coil of solenoid 246 has conductors 400, 401 connected thereto and leading to the conductor 396 and to ground, respectively. It is now apparent that the closing of switch 374 of relay 371 also energizes the coil of solenoid 246, whereupon the plunger of solenoid 246 is moved from left to right in FIGURES 4, 12 and 18 to withdraw latch 255 from engagement with ratchet wheel 223, thus permitting composite shaft 180 and spiders 72, 73 to be rotated one step by intervening connections with the indexing drive shaft 227.

In order to prevent the rearmost arms of spiders 72, 73 from moving too far away from a coiler can positioned at the ingress portion of the transferring apparatus (see arm 75 of spider 73 and can C-6 in FIGURE 3) and to thereby insure that the latter coiler can will be properly engaged by the next succeeding arms of the spiders 72, 73 as such next succeeding arms move rearwardly away from the can last transferred from the turntable 27 onto the hand truck 45, it is necessary that the conveyor 47 is operated during movement of spiders 72, 73 so the corresponding can at the ingress portion of the transfer apparatus, such as can C-6 in FIGURE 3, will be moved forwardly or from right to left against the back convex surfaces of the adjacent preceding arms, such as the arm 75 of spider 73 in FIGURE 3, at least until the corresponding can is so positioned as to be properly engaged by the next succeeding arms of the spiders 72, 73.

Accordingly, it will be observed in the lower portion of FIGURE 18 that conductor 382 has a conductor 403 extending therefrom, to a medial portion of which one end of a conductor 404 is connected. The other end of conductor 404 is connected to electric motor 285 of conveyor 47 and the other side of motor 285 has a conductor 405 extending therefrom to ground. It is apparent, therefore, that current flows through electric motor 285 whenever switch 374 of relay 371 is closed, thus transmitting movement to conveyor 47. The speed of the upper run of conveyor 47 is not critical, since if conveyor 47 moves at a slower speed than the speed at which the arms of the spiders 72, 73 move during each can transferring operation, as is desirable, such speed need only be sufficient that the outermost roller 210 on the next succeeding arm will engage the cylindrical wall of the corresponding leading can on the conveyor 47 at a point sufficiently outwardly of the median diametrical plane of the corresponding can to cause the corresponding can to be advanced to the intermediate position thereby, such as that position occupied by can C-7 in FIGURES 2 and 3.

As heretofore stated, in order to insure that a can C is positioned at the ingress portion of base platform 55 in the interim between successive can transfer operations, it is only necessary that at least one can is positioned at some point upon the upper run of magazine feed conveyor 47, such as by movement of a can or cans C along the end roller conveyor 46. Thus, if a coiler can C is not moved substantially to the position occupied by can C-6 in FIGURES 2 and 3 during the interval in which conveyor motor 285 is energized by switch 374 occupying closed position, conveyor motor 285 still remains energized until such time as a can is moved by the conveyor 47 to substantially the position occupied by can C-6 in FIGURES 2 and 3.

Accordingly, it will be observed in FIGURE 18 that conductor 377 has a conductor 407 leading therefrom to one side of the normally open switch 320, and the other side of switch 320 has the corresponding end of conductor 403 connected thereto. Thus, whenever switch 373 of relay 371 and switch 320 are closed, it is apparent that conveyor motor 285 is energized. Although the conveyor motor 285 is described herein as being a D.C. motor, it is apparent that the circuit of FIGURE 18 may readily be modified so that the conveyor motor 285 may be an A.C. motor, without departing from the spirit of the invention.

At the end of each can transferring operation, a corresponding projection 276, 275 or 277 on the cam 280 successively engages and momentarily opens switches m, n in succession and then permits them to close. It is apparent that upon switch m being opened, this breaks the circuit to the coil of relay 392, thus opening switch 391 to break the circuit to the coil of indexing clutch 237 and permitting indexing shaft 227 to idle momentarily. At the same time that switch 391 is opened, due to limit switch m being opened, the circuit to the coil of solenoid 246 is broken, thus permitting spring 260 (FIGURE 12) to move latch 255 into engagement with ratchet wheel 223. Thereafter, at the instant that the can C is then substantially positioned on the turntable 27, the corresponding projection on cam wheel 280 (FIGURES 11 and 18) engages and momentarily opens normally closed limit switch n and breaks the circuit to the coil of main relay 371, thus opening switch 374 and closing switch 373 of relay 371.

Upon switch 374 moving to open position, it is apparent that the circuit to conveyor motor 285 may then be broken unless switch 320 is then in closed position. Since switch 373 is moved to closed position as switch 374 moves from closed to open position, it is apparent that main drive clutch 100 and electromagnetic brake 245 are both actuated, whereupon the next succeeding shoulder or tooth 257 on ratchet wheel 223 (FIGURES 12 and 18) moves into engagement with the latch 255 and the spiders 72, 73 are locked in the corresponding indexed position. As heretofore stated, when the spiders 72, 73 reach the latter indexed position, the corresponding can, such as can C-1 of FIGURE 1, slides over the ridge 32 (FIGURE 6) on turntable 27, thus moving away from the rollers 210 on the corresponding arms of spiders 72, 73.

As each successive coiler can C moves over the ridge 32 on turntable 27 and approaches fully indexed position, it starts to turn under the influence of the rubbing action of turntable 27 with the lower end or flange 31 of the corresponding can C, and this further assists in causing the flange 31 to drop over the tapered ridge 32 to effect consequent movement of the body of the corresponding can C away from the rollers 210 of the corresponding arms of spiders 72, 73.

Also, as soon as the piston 34 of the corresponding can C starts to move under and against or in close proximity to the coiler plate or tube gear 25, the sliver issuing from the tube gear 25 is held against the lower surface thereof and coiling of the sliver commences. Due to the relative movement between the coiler plate 25 and the upper surface of the piston or false bottom 34 and the upper upward pressure of the corresponding piston 34 against the sliver between the coiler plate 25 and the corresponding piston 34, the residual portion of sliver between the can then positioned on turntable 27 and the preceding filled can is taken up simultaneously with the coiling of the sliver issuing from the coiler plate or tube gear 25. As heretofore stated, since the mass of sliver in the preceding can is pressing against the lower surface of the spectacle plate 40, the residual sliver taken up between the coiler plate 25 and the corresponding false bottom or piston 34, is drawn taut thereby, and is finally broken or parted.

During each successive transfer operation, the can at the ingress portion of the base platform 55 is engaged by those arms of the spiders 72, 73 which had last moved a filled can to the doffed position, such as that occupied by can C-2 in FIGURE 3 and, since the arms of the spiders 72, 73 move at a high rate of speed as compared to the speed of the conveyor 47, the can at the ingress portion is rapidly moved to the intermediate position, such as that occupied by can C-7 in FIGURE 3. This moves the corresponding can away from the preceding can at such high speed that a gap remains between the then leading can on the conveyor 47 and the arms of the spiders 72, 73 engaging the preceding coiler can. This is desirable, since it provides a space for the corresponding arms of the spiders 72, 73 to move into position between the adjacent cans such as cans C-6 and C-7.

However, since deenergization of the coil of main relay 371 breaks the circuit to the conveyor motor 285 effected by the switch 374, the closing of switch 373 then renders switch 320 effective to complete the circuit to the conveyor 47, thus continuing movement of the conveyor 47 until the next succeeding can moves to substantially the position occupied by the can C-6 in FIGURE 3. At this time, the corresponding can engages the switch arm 321 and opens the switch 320, whereupon cans are positioned at substantially the positions occupied by cans C-6 and C-7 preparatory to a succeeding transfer operation. Of course, as heretofore stated, if a can is not positioned immediately rearwardly of the can then positioned at the ingress portion of the apparatus at the time of an indexing or can transferring operation, the switch 320 will remain closed and the conveyor 47 will continue to operate until such time as a can is directed thereto, or at least, until such time as a can thereon is moved to the ingress portion of the transferring apparatus, to complete a cycle in the operation thereof.

It is thus seen that I have provided a novel method of and apparatus for transferring coiler cans to and from a sliver mechanism in which the cans are moved in one direction from a magazine in which empty cans are stored, and in a stepwise manner, along a predetermined path beneath and beyond the feeding and coiling mechanism 24, which predetermined path is defined by the feed conveyor 47 of the magazine, the guide track 212, the arms of the spiders 72, 73 and the guide means 214, 230 at opposite sides of the cans being transferred from the turntable 27.

It is seen further that the movement of each successive can along said path is stopped at the end of each step thereof with a corresponding empty can positioned beneath the feeding and coiling mechanism 24 and for a sufficient length of time such that a substantial amount of sliver is fed and coiled into the corresponding can so that the can then beneath the feeding and coiling mechanism 24 may be considered as a filled can. It is also seen that the method and apparatus of the present invention embodies means, such as the spectacle plate 40, for applying pressure to the upper end of each filled can as it is doffed and advanced beyond the feeding and coiling mechanism so that the sliver S-1 being fed continuously throughout each transferring operation may move into the space between the previously doffed filled can and the next succeeding empty can.

Thus, the false bottom or piston 34 in the empty can then being positioned on the turntable, beneath the feeding and coiling mechanism 24, yieldably bears against the coiler plate 25 and/or the spectacle plate 40 and rotates relative to the coiler plate of the feeding and coiling mechanism so that any residual sliver between the last filled can and the next succeeding empty can is taken up between the coiler plate and the false bottom of the empty can and is ultimately drawn taut and parted at some point between the latter two cans, thus enabling continuous uninterrupted operation of the coiler mechanism 24 and the drafting zone 20 throughout each can transfer operation, and wherein any desired number of successive cans may be filled and doffed from beneath the feeding and coiling apparatus without interrupting the operation thereof.

The term "filled can" as used throughout the specification and claims is indicative of a coiler can having any predetermined amount of sliver therein as determined by the counter 71, and wherein the mass of sliver in such coiler can protrudes above the upper end of the cylindrical wall of the corresponding can.

In the drawings and specification there has been set forth a preferred embodiment of the invention and, although specific terms are employed, they are used in a generic and descriptive sense only and not for purposes of limitation, the scope of the invention being defined in the claims.

I claim:
1. In a coiler mechanism for coiling sliver into successive coiler cans positioned therebeneath, wherein each of the cans has an upwardly biased false bottom, and wherein the coiler mechanism has a rotating coiler head provided with a coiler plate for feeding and coiling sliver into the cans, and means for rotating said coiler head; the combination therewith of
  (a) means for transferring successive filled cans of sliver from beneath said coiler head and for replacing the same with an empty can with the filled can of sliver being a predetermined distance from the succeeding empty can and with the sliver extending therebetween, said transferring means comprising
    (1) a pair of vertically spaced spiders having circularly spaced complementary radially extending arcuate arms thereon,
    (2) means responsive to filling each successive can beneath said coiler head for imparting a step in rotation to said spiders sufficient to transfer the corresponding filled can away from beneath said coiler plate and to replace the filled can with a succeeding empty can, and
    (3) means for feeding successive empty cans to a position adjacent the arms of said spiders and prior to the respective arms replacing a filled can with an empty can,
  (b) means adjacent said coiler head and extending therefrom in the direction of transfer of each successive filled can of sliver for pressure engagement with the sliver in the filled can, and
  (c) said coiler head being rotated and feeding sliver during operation of said transfer means.

2. In combination with a coiler mechanism having a rotating coiler head for feeding and coiling sliver in successive coiler cans positioned therebeneath, and a rotating turntable beneath the coiler head for receiving and rotating each successive can;
  (a) a fixed platform having an opening therein of a size larger than the lower ends of the cans and coinciding with the turntable,
  (b) a magazine for containing a plurality of empty coiler cans and including a normally inactive movable conveyor for transferring cans onto said platform,
  (c) means responsive to a predetermined amount of sliver being coiled into each successive can on the turntable for engaging and moving the corresponding can away from the turntable while engaging and moving a succeeding empty can from said platform onto the turntable,
  (d) means operatively associated with said responsive means for activating said conveyor for a predetermined interval, and
  (e) said conveyor being operable when activated to move another empty can into position to be engaged and moved by said responsive means upon a succeeding operation of said responsive means.

3. In a sliver coiling mechanism having a driven turntable for supporting and rotating successive coiler cans thereon one at a time, and a driven rotary coiler plate for receiving, feeding and coiling sliver into each successive coiler can on said turntable and being spaced above said turntable a distance greater than the height of each can, said turntable including a circular ridge projecting upwardly therefrom and being of lesser diameter than said turntable and each coiler can having an annular flange on its lower end adapted to fit over said ridge; the combination therewith of
  (a) means for transferring a can, upon being filled with a predetermined amount of sliver, off and to a position spaced from said turntable while transferring a succeeding empty can onto said turntable during rotation of the coiler plate,
(b) each can having an upwardly biased false bottom therein normally projecting above and rotating with the same and pressing the sliver against said coiler plate as the corresponding can, when empty, is transferred onto said turntable,
(c) a pressure plate extending from adjacent said coiler plate in the direction of transfer of each successive filled can for pressure engagement with the mass of sliver in the filled can whereby the coiler plate coils up, pulls taut and then parts the sliver extending between the filled can and the succeeding empty can,
(d) a base platform having an opening therein of greater diameter than the lower ends of said cans and coinciding with said turntable, the upper surface of said platform defining the rear edge of the opening being at least as high as the top level of said ridge and the upper surface of said platform defining the front edge of the opening being at least as low as the bottom of said ridge with respect to the direction of transfer of said cans, and
(e) said transferring means (a) being operable to slide cans upon said platform and also including means for tilting forwardly the upper end of said filled can until its flange clears said ridge and to then push said filled can over said ridge and upon said platform.

4. In a sliver coiling mechanism having a driven turntable for supporting and rotating successive coiler cans thereon one at a time, and a driven rotary coiler plate for receiving, feeding and coiling sliver into each successive coiler can on said turntable and being spaced above said turntable a distance greater than the height of each can, said turntable including a circular ridge projecting upwardly therefrom and being of lesser diameter than said turntable, and each coiler can having an annular flange on its lower end adapted to fit over said ridge; the combination therewith of
(a) means for transferring a can, upon being filled with a predetermined amount of sliver, off and to a position spaced from said turntable while transferring a succeeding empty can onto said turntable during rotation of the coiler plate,
(b) each can having an upwardly biased false bottom therein normally projecting above and rotating with the same and pressing the sliver against said coiler plate as the corresponding can, when empty, is transferred onto said turntable,
(c) a pressure plate extending from adjacent said coiler plate in the direction of transfer of each successive filled can for pressure engagement with the mass of sliver in the filled can whereby the coiler plate coils up, pulls taut and then parts the sliver extending between the filled can and the succeeding empty can,
(d) a base platform having an opening therein of greater diameter than the lower ends of said cans and coinciding with said turntable, the upper surface of said platform defining the rear edge of the opening being at least as high as the top level of said ridge and the upper surface of said platform defining the front edge of the opening being at least as low as the bottom of said ridge with respect to the direction of transfer of said cans,
(e) said transferring means (a) comprising
(1) a substantially vertically disposed indexing shaft adjacent said coiler plate and said turntable,
(2) spaced upper and lower spiders on said shaft,
(a') each spider having a plurality of substantially radially extending arms thereon for engaging and imparting movement to respective coiler cans,
(3) means responsive to a predetermined amount of sliver being deposited in a can by the rotating coiler plate for imparting a step in rotation to said shaft through an angle equal to the angular relationship of adjacent arms on said spiders,
(4) means securing said upper spider in fixed relation to said shaft, and
(5) means securing said lower spider to said shaft for limited yielding angular movement relative to said shaft such that said shaft and said upper spider move relative to said lower spider upon initiation of each step thereof while said lower spider is restrained from such movement until the corresponding filled can is tilted so that its flange clears said ridge, whereupon said spiders transfer said filled can and the next succeeding can in the aforesaid manner.

5. A structure according to claim 4, including
(6) each of said arms being of arcuate form with its concave inner surface substantially corresponding to the shape of said cans, and
(7) each of said arms having a plurality of rollers journaled therein and projecting from the concave surface of the respective arm.

6. A structure according to claim 4, in which said circular ridge has a tapered peripheral surface and said responsive means is operable to stop each step in rotation of said shaft as the leading edge of the flange on a corresponding empty can starts to fall over said ridge so the tapered peripheral surface thereof directs the latter empty can away from the adjacent arms of the spiders.

7. In a sliver coiling mechanism having a driven turntable for supporting and rotating successive coiler cans thereon one at a time, and a driven rotary coiler plate for receiving, feeding and coiling sliver into each successive coiler can on said turntable and being spaced above said turntable a distance greater than the height of each can, said turntable including a circular ridge projecting upwardly therefrom and being of lesser diameter than said turntable and each coiler can having an annular flange on its lower end adapted to fit over said ridge; the combination therewith of
(a) means for transferring a can, upon being filled with a predetermined amount of sliver, off and to a position spaced from said turntable while transferring a succeeding empty can onto said turntable during rotation of the coiler plate,
(b) each can having an upwardly biased false bottom therein normally projecting above and rotating with the same and pressing the sliver against said coiler plate as the corresponding can, when empty, is transferred onto said turntable,
(c) a pressure plate extending from adjacent said coiler plate in the direction of transfer of each successive filled can for pressure engagement with the mass of sliver in the filled can whereby the coiler plate coils up, pulls taut and then parts the sliver extending between the filled can and the succeeding empty can,
(d) a base platform disposed on substantially the same level as said turntable,
(e) means for storing and feeding coiler cans onto said platform,
(f) said transferring means (a) comprising
(1) a substantially vertical indexing shaft adjacent said turntable and extending between said platform and said pressure plate,
(2) at least one spider mounted on and rotatable with said shaft and having a plurality of substantially equally circularly spaced and substantially radially extending arms thereon for engaging and sliding respective cans along said platform as cans are fed thereto by said storing and feeding means, and
(3) means operable automatically each time a can on said turntable is filled with a predetermined amount of sliver for rotating said shaft and spider through an angle substantially equal to the angular relationship of adjacent arms on said spider, and said feeding means (e) being operable to position each succeeding can in close proximity to the back of the next preceding arm of said spider with respect to the direction of transfer of said cans.

8. A structure according to claim 7, in which said storing and feeding means (e) comprises
 (1) an endless conveyor adapted to support empty coiler cans thereon,
 (2) normally inactive means for driving said conveyor,
 (3) means operable automatically in the absence of a can being positioned in close proximity to the back of the next preceding arm of said spider while the spider is at a standstill for actuating said driving means until a can is advanced to said last-mentioned position, and
 (4) means operable automatically during rotation of said spider for again actuating said driving means to move the latter can toward the next preceding arm of the spider as the latter arm moves in a direction away from the latter can.

9. A structure according to claim 8, in which said spider moves successive cans in a substantially semicircular path during a plurality of steps of said spider, and said storing and feeding means further comprising
 (5) a substantially semicircular roller conveyor spaced from said platform and having one of its ends positioned adjacent to and substantially in alinement with the end portion of said endless conveyor remote from said platform,
 (6) said platform having an egress portion thereon provided with a free edge extending at an angle relative to the path of successive filled cans transferred off of said turntable,
 (7) the end of said roller conveyor opposite from said one of its ends having an ingress plate thereon provided with a free edge extending at an angle substantially corresponding to, but being spaced from, the edge of said egress portion,
 (8) a truck removably positioned between said free edges of said platform and said ingress plate, said truck having a bottom including a second roller conveyor and a pair of truck plates on opposite ends of the second roller conveyor, and said truck plates having angularly extending distal edges adapted to fit beneath and above the egress portion of said platform and said ingress plate, respectively.

10. In a drawing frame having drafting rolls, a coiler mechanism including a rotating coiler plate for receiving textile sliver from the drafting rolls and feeding and coiling the sliver into successive coiler cans, a turntable operatively connected to said coiler mechanism and spaced beneath said coiler plate, and means for driving said rolls and said coiler plate; the combination of
 (a) means responsive to the filling of successive cans with a predetermined amount of sliver for reducing the speed of said drafting rolls and said coiler plate and for transferring such successive filled cans from beneath the coiler plate while replacing the same with a succeeding empty can with the filled can being a predetermined distance from the succeeding empty can and with the sliver extending therebetween,
 (b) a spectacle plate having its lower surface substantially flush with the lower surface of said coiler plate and against which the sliver in each filled can bears in pressure engagement therewith,
 (c) each coiler can having an upwardly biased false bottom adapted to bear against said spectacle plate during replacement of the preceding filled can thereby,
 (d) the distance between said coiler plate and said turntable being greater than the height of the cans, but less than the combined height of the cans and the false bottoms thereof when empty,
 (e) said coiler plate being rotated and feeding sliver during each operation of said responsive means so the sliver between each transferred filled can and the succeeding empty can is coiled, pulled taut and then pulled apart by said coiler plate,
 (f) a base platform positioned on substantially the same level as said turntable and along which said cans are moved during each operation of said responsive means,
 (g) said responsive means comprising
  (1) an upright indexing shaft adjacent said coiler plate and said turntable,
  (2) at least one spider mounted on said shaft and having a plurality of radially extending arcuate arms thereon for engaging and moving respective cans during each movement of said shaft,
  (3) means for driving and imparting a step in rotation to said shaft upon each successive can being filled with sliver by said coiler plate,
  (4) means for disconnecting said driving means from said coiler plate and said rolls and permitting them to coast during each step in rotation of said shaft, and
  (5) means to restore said driving means for driving said rolls and said coiler plate in response to termination of each step in rotation of said indexing shaft.

11. A structure according to claim 10, including means for locking said shaft against rotation upon termination of each step in rotation thereof, and means for releasing said shaft from said locking means each time a can is filled with said predetermined amount of sliver by said coiler plate.

12. In a sliver coiling mechanism having a turntable for supporting and rotating successive coiler cans thereon one at a time, a rotary coiler plate for coiling sliver into each successive coiler can on said turntable and being spaced above said turntable a distance greater than the height of each can, said turntable including a circular ridge projecting upwardly therefrom and being of lesser diameter than said turntable, and each coiler can having an annular flange on its lower end adapted to fit over said ridge; the combination therewith of
 (a) a base platform having an opening therein of greater diameter than the lower ends of said cans and coinciding with said turntable, the upper surface of said platform defining the rear edge of the opening being at least as high as the top level of said ridge and the upper surface of said platform defining the front edge of the opening being at least as low as the bottom of said ridge with respect to the direction of transfer of said cans,
 (b) means for transferring a can, upon being filled with a predetermined amount of sliver, off and to a position spaced from said turntable while transferring a succeeding empty can onto said turntable comprising
  (1) a substantially vertically disposed indexing shaft adjacent said coiler plate and said turntable,
  (2) spaced upper and lower spiders on said shaft,
   (a') each spider having a plurality of substantially equally circularly spaced and substantially radially extending arms thereon for engaging and imparting movement to respective coiler cans,
  (3) means responsive to a predetermined amount of sliver being deposited in a can by the coiler plate for imparting a step in rotation to said shaft through an angle equal to the angular relationship of adjacent arms on said spiders, (4) means securing said upper spider in fixed relation to said shaft, and (5) means securing said lower spider to said shaft for limited yielding angular movement relative to said shaft such that said shaft and said upper spider move relative to said lower spider upon initiation of each step thereof while said lower spider is restrained from such movement until the corresponding filled can is tilted so that its flange clears said ridge, whereupon said spiders transfer said filled can and the next succeeding can in the aforesaid manner.

13. A structure according to claim 12, including (6) each of said arms being of arcuate form with its concave inner surface substantially corresponding to the shape of said cans, and (7) each of said arms having a plurality of rollers journalled therein and projecting from the concave surface of the respective arm.

14. A structure according to claim 12, in which said circular ridge has a tapered peripheral surface and said responsive means is operable to stop each step in rotation of said shaft as the leading edge of the flange on a corresponding empty can starts to fall over said ridge so the tapered peripheral surface thereof directs the latter empty can away from the adjacent arms of the spiders.

15. In a sliver coiling mechanism having a turntable for supporting and rotating successive coiler cans thereon one at a time, a rotary coiler plate for coiling sliver into each successive coiler can on said turntable and being spaced above said turntable a distance greater than the height of each can, said turntable including a circular ridge projecting upwardly therefrom and being of lesser diameter than said turntable, and each coiler can having an annular flange on its lower end adapted to fit over said ridge; the combination therewith of (a) a base platform disposed on substantially the same level as said turntable, (b) means for storing and feeding coiler cans onto said platform, (c) means for transferring a can, upon being filled with a predetermined amount of sliver, off and to a position spaced from said turntable while transferring a succeeding empty can onto said turntable, said transferring means comprising (1) a substantially vertical indexing shaft adjacent said coiler plate and said turntable, (2) at least one spider mounted on and rotatable with said shaft and having a plurality of substantially equally circularly spaced and substantially radially extending arms thereon for engaging and sliding respective cans along said platform as cans are fed thereto by said storing and feeding means, (3) means operable automatically each time a can on said turntable is filled with a predetermined amount of sliver for rotating said shaft and spider through an angle substantially equal to the angular relationship of adjacent arms on said spider, and said feeding means defined in (b) being operable to position each succeeding can in close proximity to the back of the next preceding arms of said spider with respect to the direction of transfer of said cans.

16. A structure according to claim 15, in which said storing and feeding means (b) comprises (1) an endless conveyor adapted to support empty coiler cans thereon, (2) normally inactive means for driving said conveyor, (3) means operable automatically in the absence of a can being positioned in close proximity to the back of the next preceding arm of said spider while the spider is at a standstill for actuating said driving means until a can is advanced to said last-mentioned position, and (4) means operable automatically during rotation of said spider for again actuating said driving means to move the latter can toward the next preceding arm of the spider as the latter arm moves in a direction away from the latter can.

17. A structure according to claim 16, in which said spider moves successive cans in a substantially semicircular path during a plurality of steps of said spider, and said storing and feeding means further comprising (5) a substantially semicircular roller conveyor spaced from said platform and having one of its ends positioned adjacent to and substantially in alinement with the end portion of said endless conveyor remote from said platform, (6) said platform having an egress portion thereon provided with a free edge extending at an angle relative to the path of successive filled cans transferred off of said turntable, (7) the end of said roller conveyor opposite from said one of its ends having an ingress plate thereon provided with a free edge extending at an angle substantially corresponding to, but being spaced from, the edge of said egress portion, (8) a truck removably positioned between said free edges of said platform and said ingress plate, said truck having a bottom including a second roller conveyor and a pair of truck plates on opposite ends of the second roller conveyor, and said truck plates having angularly extending distal edges adapted to fit beneath and above the egress portion of said platform and said ingress plate, respectively.

18. In a drawing frame having drafting rolls, a coiler mechanism including a rotating coiler plate for receiving textile sliver from the drafting rolls and feeding and coiling the sliver into successive coiler cans, a turntable operatively connected to said coiler mechanism and spaced beneath said coiler plate, and means for driving said rolls and said coiler plate; the combination of (a) means responsive to the filling of successive cans with a predetermined amount of sliver for transferring such successive filled cans from beneath the coiler plate while replacing the same with a succeeding empty can with the filled can being a predetermined distance from the succeeding empty can and with the sliver extending therebetween, (b) a base platform positioned on substantially the same level as said turntable and along which said cans are moved during each operation of said responsive means, (c) said responsive means comprising (1) an upright indexing shaft adjacent said coiler plate and said turntable, (2) at least one spider mounted on said shaft and having a plurality of radially extending arcuate arms thereon for engaging and moving respective cans during each movement of said shaft, (3) means for driving and imparting a step in rotation to said shaft upon each successive can being filled with sliver by said coiler plate, (4) means for disconnecting said driving means from said coiler plate and said rolls and permitting them to coast during each step in rotation of said shaft, and (5) means to restore said driving means for driving said rolls and said coiler plate in response to termination of each step in rotation of said indexing shaft.

19. A structure according to claim 18, including means for locking said shaft against rotation upon termination of each step in rotation thereof, and means for releasing said shaft from said locking means each time a can is filled with said predetermined amount of sliver by said coiler plate.

(References on following page)

References Cited by the Examiner

UNITED STATES PATENTS

| | | | |
|---|---|---|---|
| 990,678 | 4/1911 | Stratton | 19—98 |
| 2,478,960 | 8/1949 | Wilkie | 19—159 |
| 2,571,880 | 10/1951 | Hinson | 19—159 |
| 3,028,637 | 4/1962 | Van Deusen | 19—159 |
| 3,083,415 | 4/1963 | Osaki et al. | 19—159 |
| 3,134,144 | 5/1964 | Still | 19—98 |

FOREIGN PATENTS

| | | |
|---|---|---|
| 17,252 | 1914 | Great Britain. |
| 865,820 | 4/1961 | Great Britain. |
| 1,215,443 | 11/1959 | France. |
| 1,243,728 | 9/1960 | France. |
| 592,851 | 2/1934 | Germany. |

DONALD W. PARKER, *Primary Examiner.*